(12) United States Patent
Plauche et al.

(10) Patent No.: US 12,721,706 B2
(45) Date of Patent: Sep. 1, 2026

(54) ORTHODONTIC WAX DISPENSER

(71) Applicant: IP2MARKET, LLC, Pottsboro, TX (US)

(72) Inventors: Cheryl Plauche, Lake Kiowa, TX (US); William Plauche, Lake Kiowa, TX (US); Brian J. Hickey, Centereach, NY (US); Staci Wright, Pottsboro, TX (US); Lauren R. Skidmore, Pottsboro, TX (US); James M. Behmke, Boston, MA (US)

(73) Assignee: IP 2 Market, LLC, Sherman, TX (US)

( * ) Notice: Subject to any disclaimer, the term of this patent is extended or adjusted under 35 U.S.C. 154(b) by 454 days.

(21) Appl. No.: 18/114,074

(22) Filed: Feb. 24, 2023

(65) Prior Publication Data

US 2023/0285126 A1 Sep. 14, 2023

Related U.S. Application Data

(60) Provisional application No. 63/313,495, filed on Feb. 24, 2022.

(51) Int. Cl.
*A61C 13/00* (2006.01)

(52) U.S. Cl.
CPC ................................ *A61C 13/0028* (2013.01)

(58) Field of Classification Search
CPC ..... A61C 13/0028; A61C 5/62; A61C 9/0026; B65D 83/762; B05C 17/00593
USPC .................... 222/390; 401/172, 179; 433/89; 184/105.2
See application file for complete search history.

(56) References Cited

U.S. PATENT DOCUMENTS 823,572 A * 6/1906 Wilson .................. A47J 43/255 241/278.1
1,691,861 A * 11/1928 Stout .................... B65D 83/761 222/320
2,052,296 A * 8/1936 Huntley ............... B65D 83/761 222/390
4,079,518 A * 3/1978 Marshall ........... B05C 17/00593 433/89
5,282,549 A * 2/1994 Scholz ................... B65D 83/75 222/326
7,325,707 B2 * 2/2008 Bougamont ....... B65D 47/2068 222/413
7,367,737 B2 * 5/2008 Johns ................. A46B 11/0079 401/277
9,283,060 B2 * 3/2016 Peuker ................ B05C 17/0133
9,914,580 B1 * 3/2018 Siciliano .............. B65D 83/761
12,357,076 B2 * 7/2025 Joung ..................... A45D 40/04
2016/0193018 A1 * 7/2016 Peuker ................. A61C 9/0026 433/90
2023/0180916 A1 * 6/2023 Byeon ..................... A45D 40/06 401/108

* cited by examiner

*Primary Examiner* — Paul R Durand
*Assistant Examiner* — Randall A Gruby
(74) *Attorney, Agent, or Firm* — Lee & Hayes, P.C.

(57) ABSTRACT

An orthodontic wax dispenser is described herein. For example, certain embodiments of the present disclosure relate to a pocket-sized orthodontic wax dispenser that has an internal storage compartment for orthodontic wax, a press mechanism (e.g., a threaded piston) to compress the stored wax through an extrusion aperture, and optionally a lid or cover, which may double as a wax cutting mechanism.

14 Claims, 24 Drawing Sheets

ORTHODONTIC WAX DISPENSER

RELATED APPLICATION

This application claims priority to U.S. Prov. Appl. No. 63/313,495, filed Feb. 24, 2022, entitled ORTHODONTIC WAX DISPENSER, by Cheryl Plauche, et al., the contents of which are incorporated herein by reference.

TECHNICAL FIELD

The present disclosure relates generally to dispensing devices, and, more particularly, to an orthodontic wax dispenser.

BACKGROUND

Braces and other orthodontic devices often cause discomfort when the associated hardware and/or wires pinch against the soft tissues inside of a wearer's mouth. Orthodontic wax, also known as braces wax or dental wax, is specially designed to relieve pain and/or prevent injuries caused by rubbing of the braces appliances by creating a barrier between the braces wires and the wearer's mouth.

Generally, orthodontic wax comes in packs of a plurality of wax "sticks", where a user removes one of the available sticks, tears off a small amount of wax from the removed stick, and rolls it into a small pea-sized ball in their fingers. The user then places the small ball of wax on their dental appliance to form the desired barrier. Typically, the wax should be replaced about twice a day, due to it falling off and/or to reduce the risks of bacteria and food particles becoming stuck on the surface of the wax.

Orthodontic wax is made from natural waxes and may contain ingredients for texture and flavor, like mint. Some orthodontic wax products are made from beeswax or carnauba wax, while others are made from microcrystalline or paraffin wax derived from petroleum. The wax is conventionally solid at room temperature, and can be softened and shaped by the warmth of the user's hands.

Current problems with the personal storage and transport of orthodontic wax are that the packs of wax sticks can become sticky, exposed repeatedly to dirt and lint, and touched by potentially unclean fingers over and over. Also, handling the wax, such as pinching and tearing the tiny balls off of the sticks, produces sticky fingers and generally a mess of wax in the storage container. Moreover, achieving an appropriate amount of wax, neither too large nor too small, may be difficult for certain users, particularly younger children that lack advanced dexterity in their fingertips.

SUMMARY

According to one or more embodiments of the disclosure, the device and techniques introduced herein relate to an orthodontic wax dispenser. For example, the orthodontic wax dispenser may include a hollow, bottom body comprising internal threads. The orthodontic wax dispenser may further include a hollow top body comprising an inner cavity configured to store wax. The bottom body may be configured to receive the top body. In addition, the top body may include external threads configured to engage with the internal threads of the bottom body, to enable the top body to be fastened and rotated in relation to the bottom body. The orthodontic wax dispenser may further include a press mechanism disposed inside of the bottom body and at least partially disposed inside of the inner cavity of the top body. The press mechanism may include a flange at a distal end thereof. The flange may be in rotatable engagement with a distal lip of the bottom body. The orthodontic wax dispenser may further include a base fastener disposed inside of the bottom body at a distal end of the bottom body. The base fastener may be configured to hold the flange of the press mechanism within the bottom body. The orthodontic wax dispenser may further include an extrusion aperture disposed at a proximal end of the top body. Upon rotation of the top body, the top body may be translated along a longitudinal axis of the bottom body. Translation of the top body toward the distal end of the bottom body may cause compression of the wax stored in the inner cavity of the top body by the press mechanism, such that a portion of the compressed wax is forced through the extrusion aperture.

Other embodiments are described herein, including various textures, accessories, and so on, and this summary is not meant to be limiting to scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, orthodontic wax is helpful for relieving pain and/or preventing injuries caused by orthodontic hardware. However, as also noted above, orthodontic wax also comes with various problems associated with storage, transport, and portioning. Currently, there is nothing in the market to specifically address this problem.

According to one or more embodiments of the disclosure, therefore, a device and techniques introduced herein relate to an orthodontic wax dispenser. In particular, as described herein, certain embodiments of the present disclosure relate to relate to a pocket-sized orthodontic wax dispenser that has an internal storage compartment for orthodontic wax, a press mechanism (e.g., a threaded piston) to compress the stored wax through an extrusion aperture, and optionally a lid or cover, which may double as a wax cutting mechanism.

Specifically, according to the present disclosure, examples of various conceived designs are shown in FIGS.

1A-6D, generally based upon the same principles of operation, with minor implementation differences.

For the purposes of the present disclosure, the terms "proximal" and "distal" are used throughout the specification and claims. It is to be understood that "proximal" generally refers to the "top" of the dispenser where the extrusion aperture is located and orthodontic wax is dispensed, as described in further detail below. It is also to be understood that "distal" generally refers to the "bottom" of the dispenser, opposite the top end of the dispenser (where the orthodontic wax is dispensed). Usage of "proximal" and "distal" may be even better understood when read in light of the accompanying drawings which clearly show the various components of the orthodontic wax dispenser.

Figure 1A:
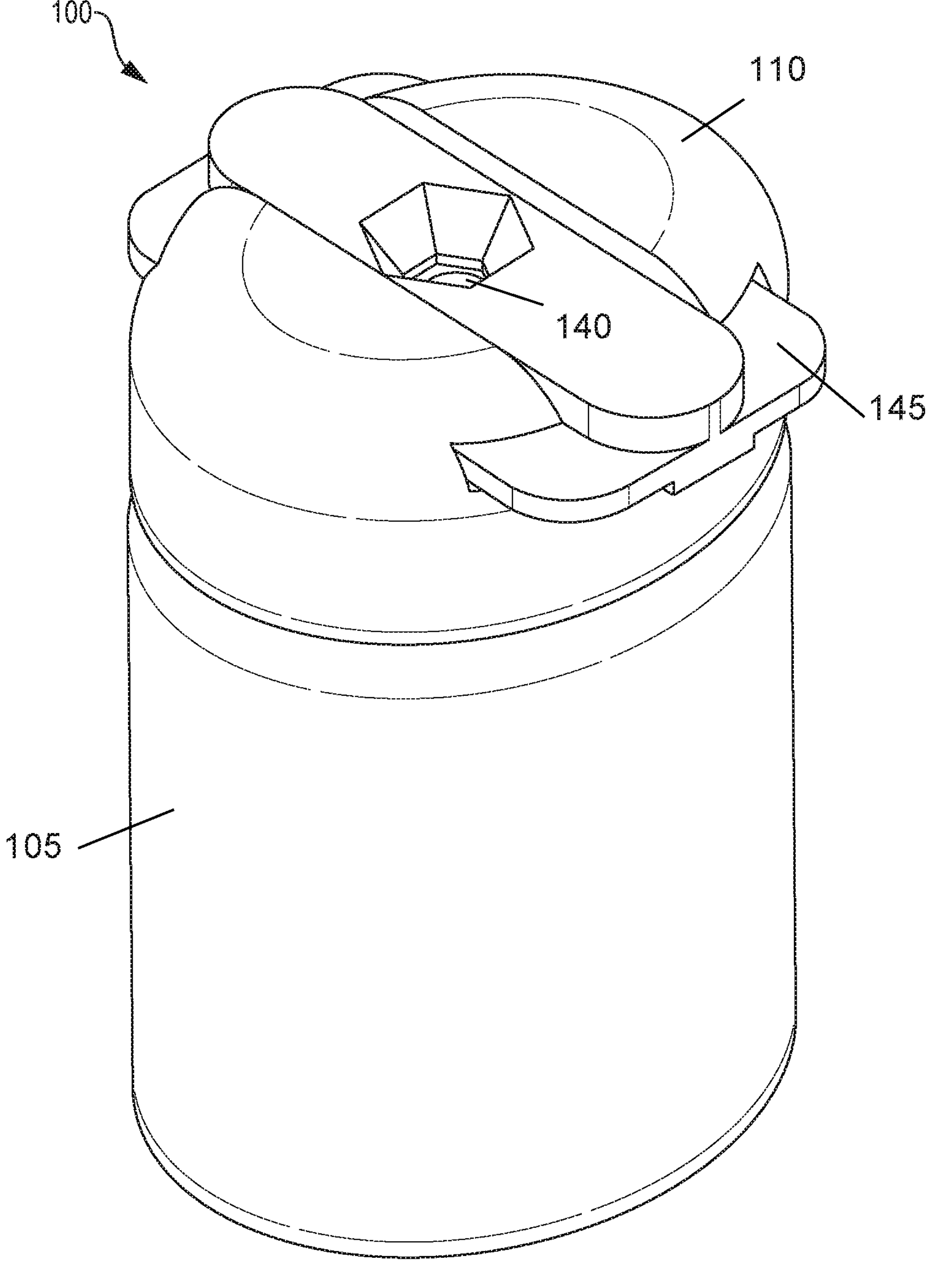
FIGS. 1A and 1B illustrate an example design of an orthodontic wax dispenser in accordance with one or more embodiments of the present disclosure.
Figure 1B:
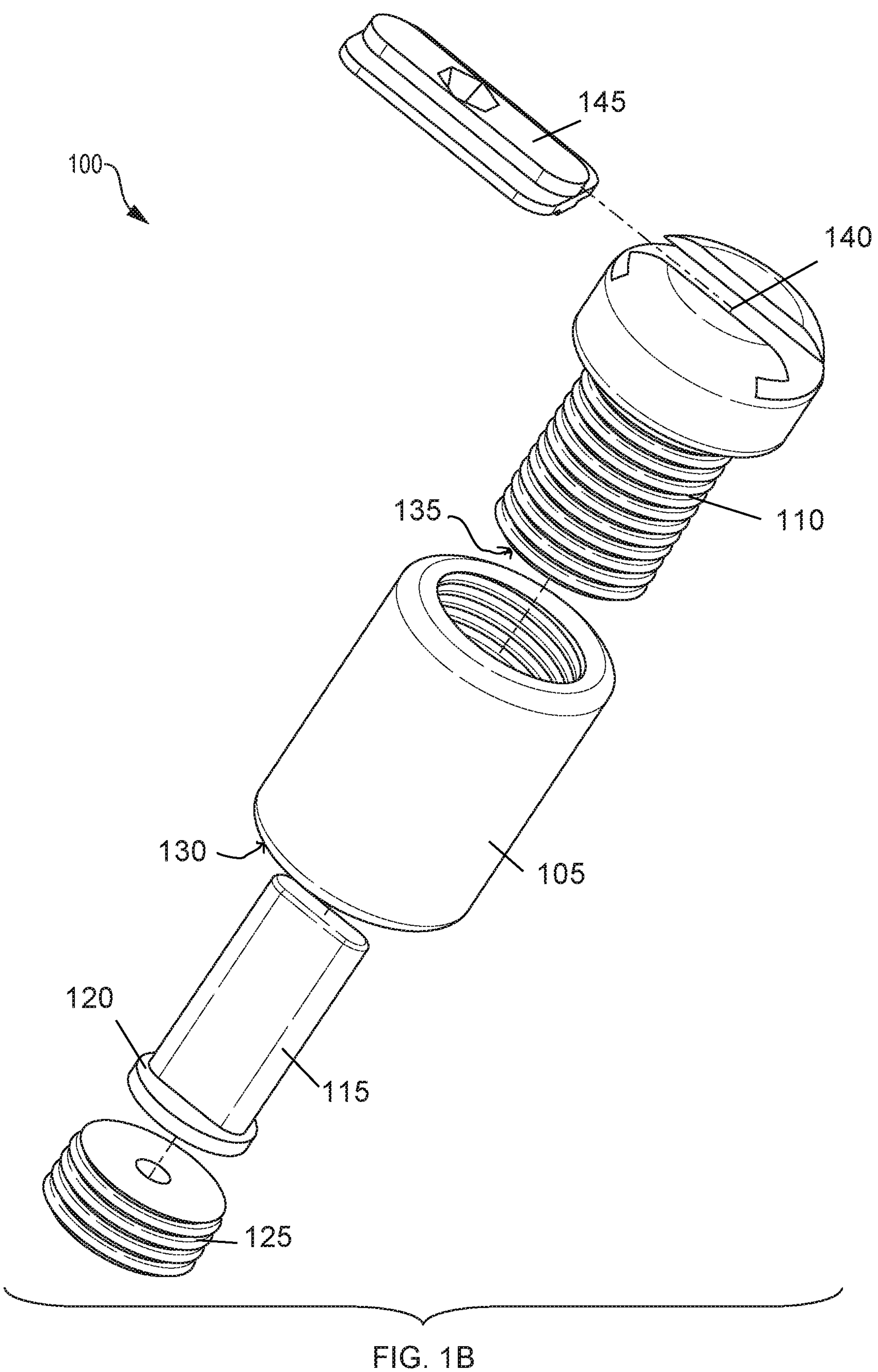

A first example design of an orthodontic wax dispenser 100 is shown in FIGS. 1A-1B (FIG. 1A illustrating an assembled view, and FIG. 1B illustrated an expanded view). The generally circular design has a hollow bottom body 105 and a hollow top body 110, which may be rotated in relation to each other, allowing for engagement of internal threads to move the top body 110 into the bottom body 105 (i.e., screwing in). An inner press mechanism 115 (e.g., a piston) may be held in place within the bottom body 110 (e.g., a threaded base fastener 125 holding a base flange 120 of the press mechanism 115 in rotatable engagement with a distal lip 130 of the bottom body 105), and rotates along with the rotation of the top body 110 as it is threaded into the bottom body 105.

The base flange 120 may be disposed at a distal end of the press mechanism 115, as shown in FIG. 1B, while the proximal end of the press mechanism 115 may be configured to compress orthodontic wax stored inside the dispenser 100, as described in greater detail below. Furthermore, the flange 120 may be in rotatable engagement with the lip 130 of the bottom body 105 of the dispenser.

The base fastener 125 may be disposed inside of the bottom body 105 at a distal end thereof, as shown in FIG. 1B. Generally speaking, the base fastener 125 may be configured to hold the flange 120 of the press mechanism 115 within the bottom body 105.

In addition, the top body 110 may comprise an inner cavity 135 that is similarly shaped to the press mechanism 115 are configured to store orthodontic wax therein. During use, the press mechanism 115 may be at least partially disposed inside the inner cavity 135. As the top body 110 is threaded into the bottom body 105, the press mechanism 115 enters the inner cavity 135 of the top body 110, compressing orthodontic wax that has been inserted. The compressed wax may then be extruded through an extrusion aperture 140 of the top body 110, and removed at the appropriate size. The extrusion aperture 140 may be disposed at a proximal end of the top body 110, as shown in FIG. 1A, for example. As further shown, a sliding cutter/cap 145 may be integrated into the top body 110 to allow closure of the dispenser 100 when not in use, and to assist in cutting the extruded wax when slid across the extrusion aperture 140 from an open position into a closed position.

Operationally, the dispenser 100 (as well as the alternative dispenser designs that follow) is designed to allow for rotation of the top body 110 relative to the bottom body 105. By rotating the top body 110 in a clockwise or counter-clockwise direction, the top body 110 may be translated along a longitudinal axis (i.e., lengthwise) of the bottom body 105, either toward the proximal end or the distal end of bottom body 105. As the top body 110 translates toward the distal end of the bottom body 105, such movement of the top body 110 may cause compression of the wax stored in the inner cavity 135 by the press mechanism 115 which is at least partially disposed therein. Said compression may force the wax through the extrusion aperture 140, thereby exiting the dispenser 100. Translation of the top body 110 toward the proximal end of the bottom body 105 may release the compression caused by press mechanism 115 on wax stored in the inner cavity 135.

Figure 2A:
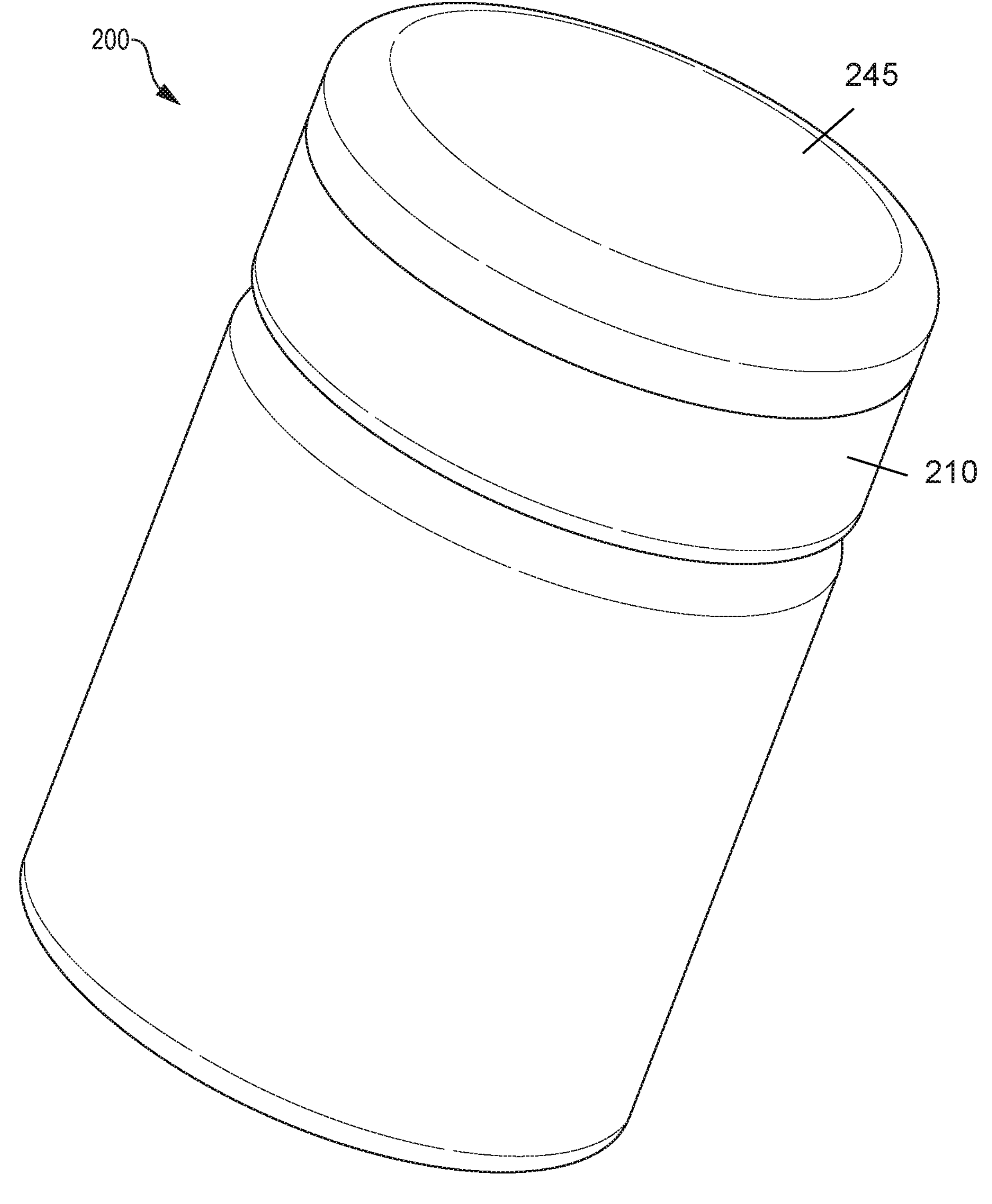
FIGS. 2A-2C illustrate another example design of an orthodontic wax dispenser in accordance with one or more embodiments of the present disclosure.
Figure 2B:
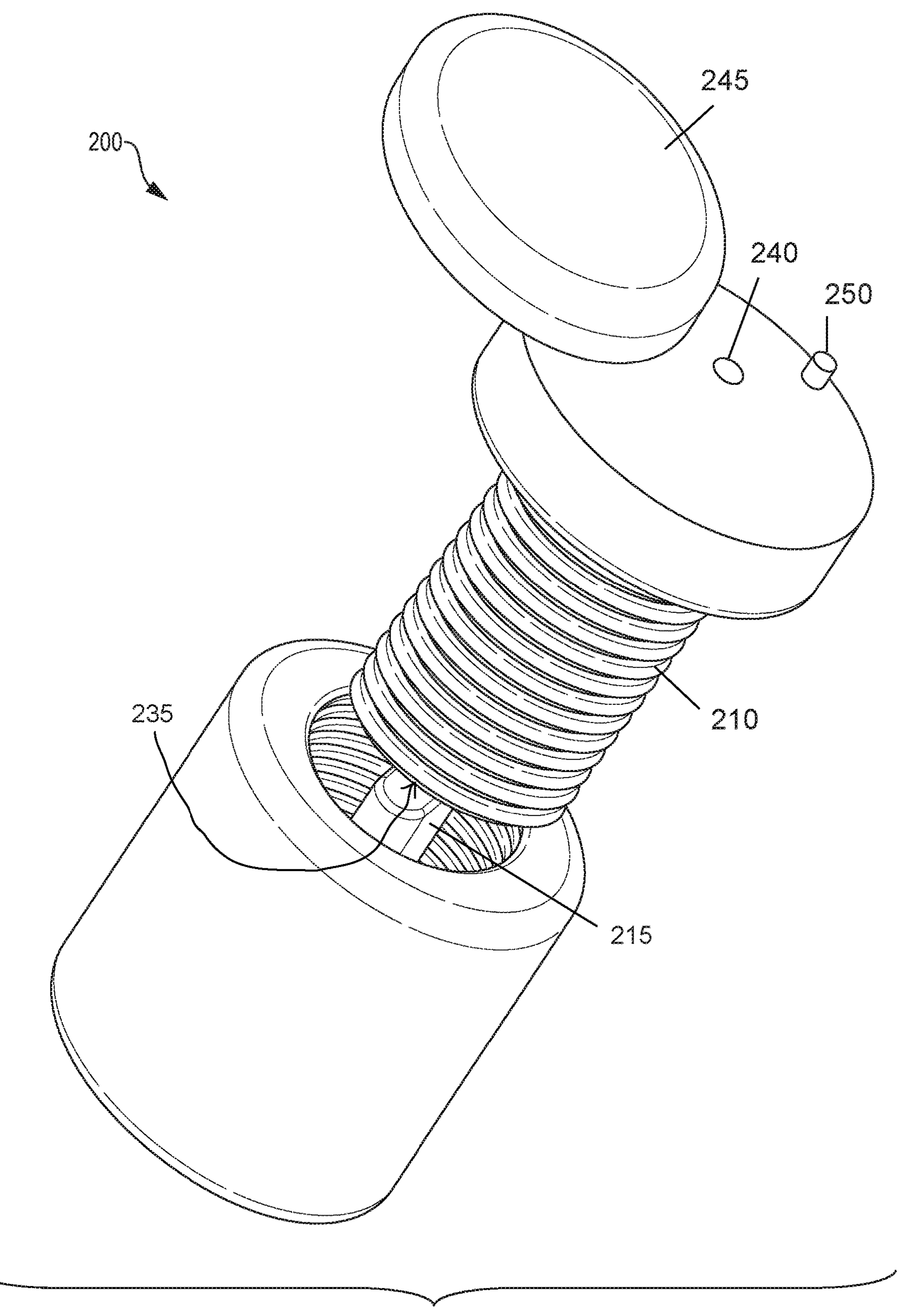
Figure 2C:
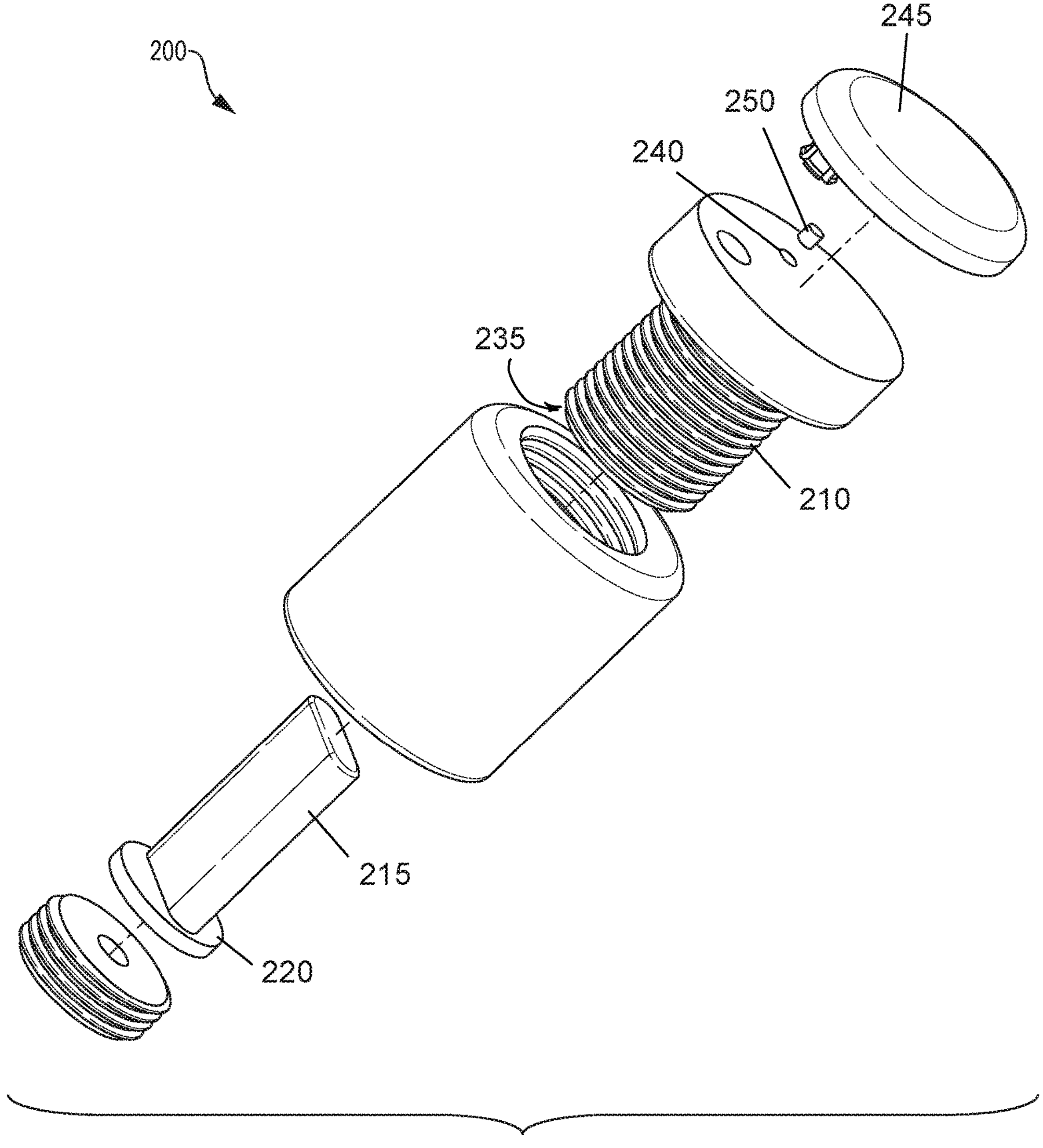

FIGS. 2A-2C illustrate another design of an example orthodontic wax dispenser 200 herein. In particular, FIG. 2A illustrates a similar design to orthodontic wax dispenser 100 above, but orthodontic wax dispenser 200 is more of an oval shape for increased rotational leverage/torque, and also now showing a rotating cap 245 on the top body 210 (with a latch 250 to secure the cap 245 in the closed position). FIG. 2B illustrates the orthodontic wax dispenser 200 with the top body 210 removed and the cap 245 in the open position, showing the press mechanism 215 entering the base (inner cavity 235) of the top body 210, and showing the extrusion aperture 240. FIG. 2C illustrates an expanded view of all components of the example orthodontic wax dispenser 200, including base flange 220 of press mechanism 215 and threaded base fastener 225, which interact in a manner similar to the interaction of base flange 120 and base fastener 125.

Figure 3A:
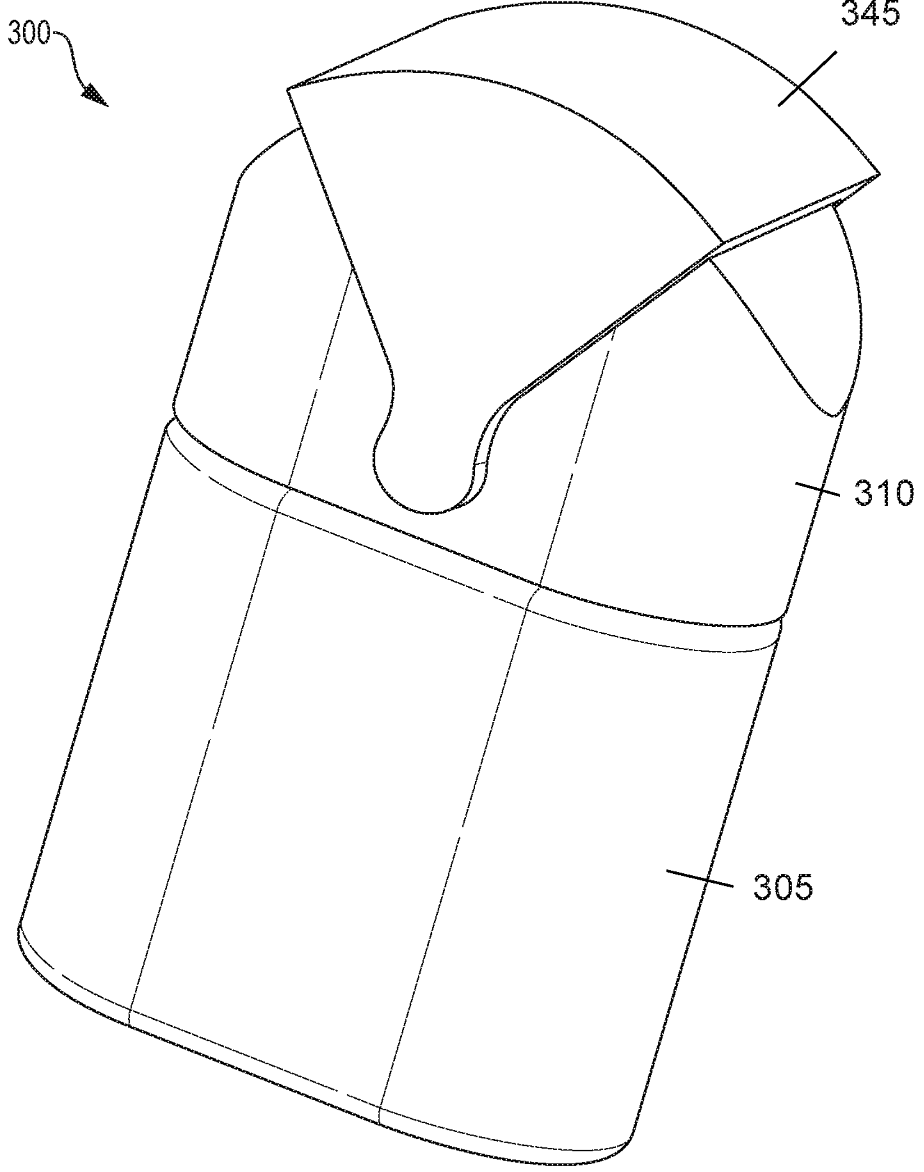
FIGS. 3A-3C illustrate still another example design of an orthodontic wax dispenser in accordance with one or more embodiments of the present disclosure.
Figure 3B:
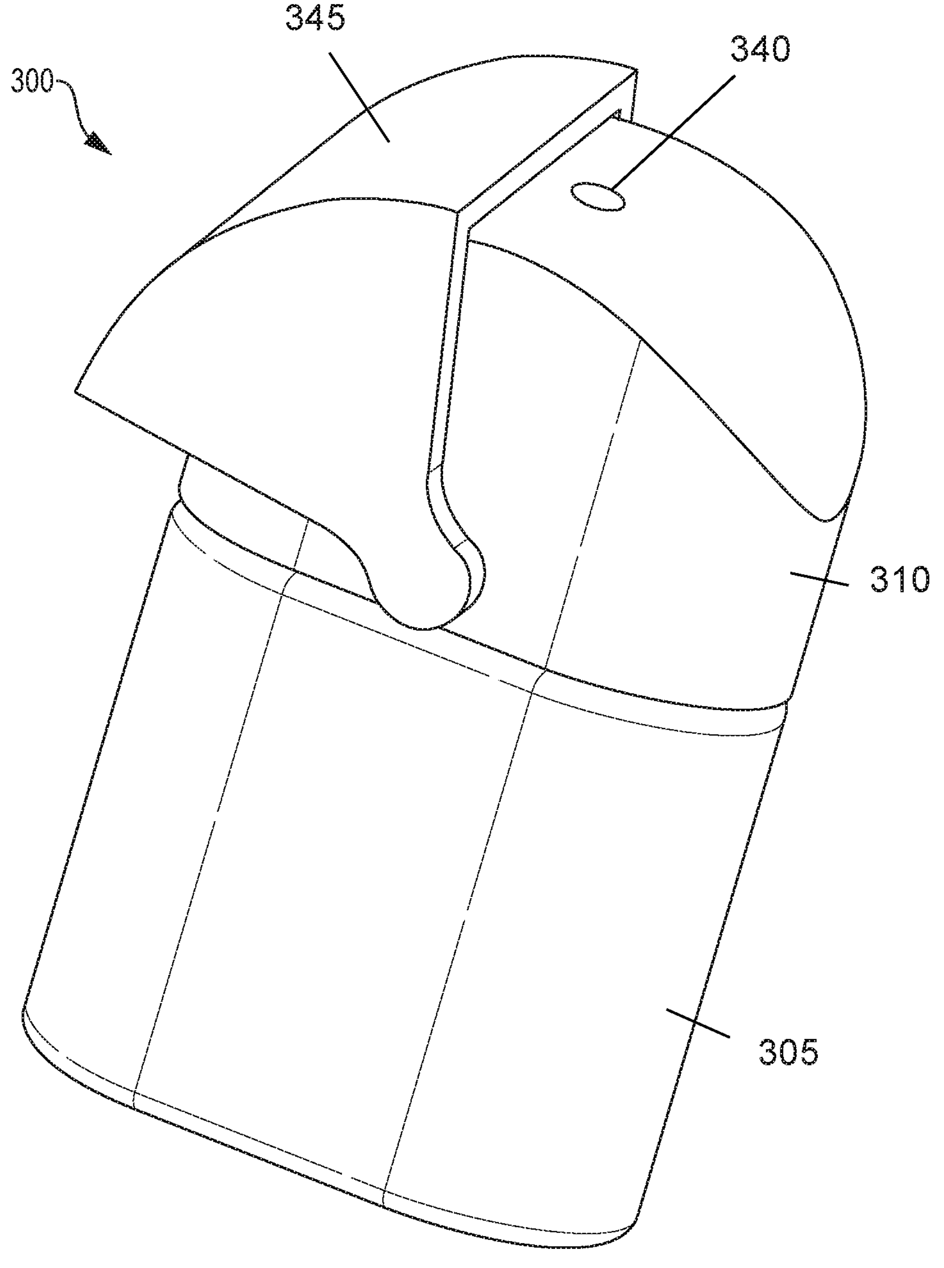
Figure 3C:
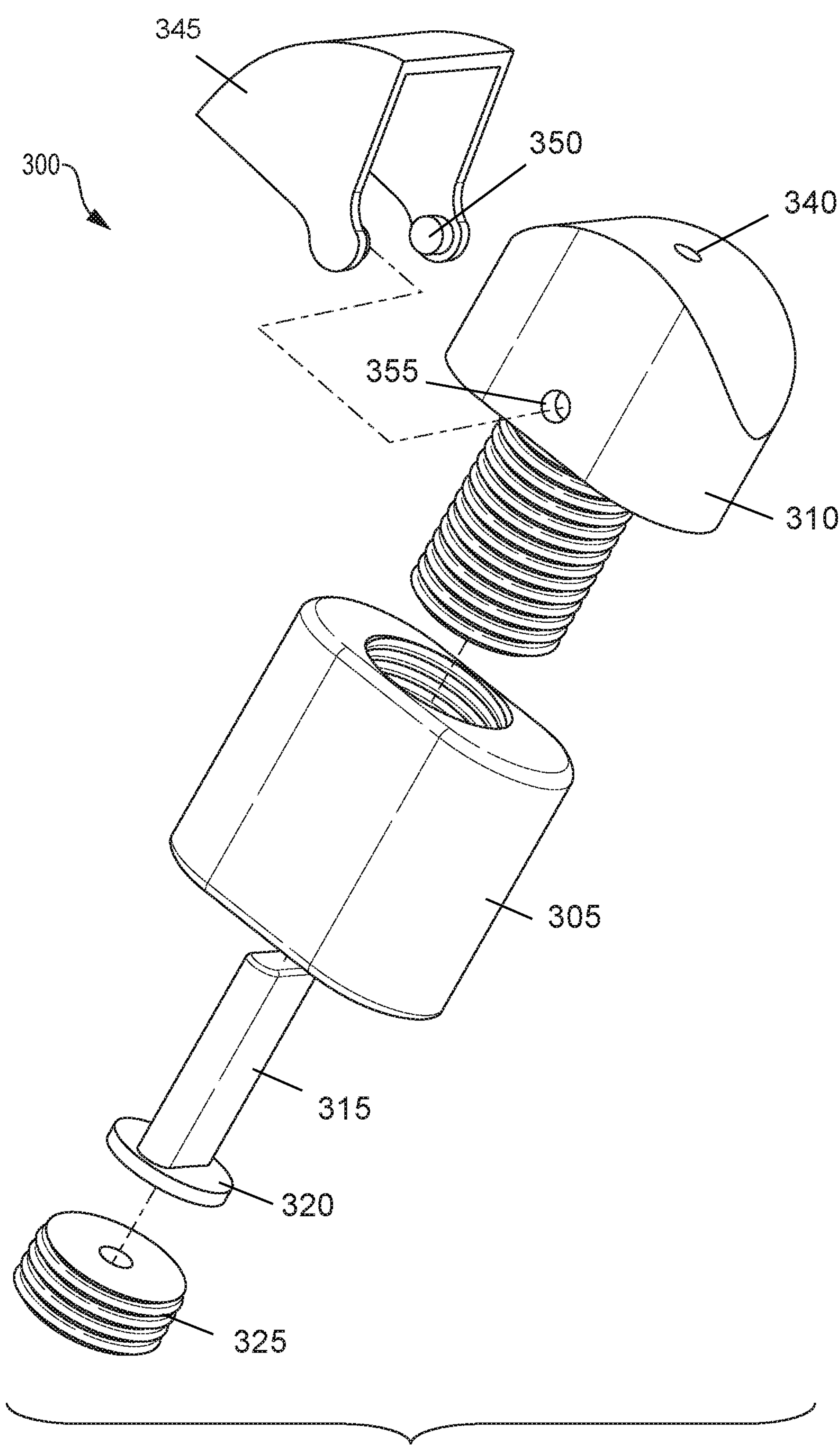

In addition, still another example design of an orthodontic wax dispenser 300 is shown in FIGS. 3A-3C. FIG. 3A shows an orthodontic wax dispenser 300 with an elongated oval design (with a straight center portion), where a pivoting cutter cap 345 (shown in the closed position) can rotate on its axis to open (shown in FIG. 3B) to allow extrusion of the wax via the extrusion aperture 340, and then may close either after manual removal of the extruded wax from the extrusion aperture 340, or else may assist in cutting the extruded wax, accordingly. FIG. 3C illustrates the orthodontic wax dispenser 300 in expanded form, generally illustrative of a similar threaded design as described above, where the press mechanism 315 stays rotatably in position within the bottom body 305 as the top body 310 threads into the bottom, forcing extrusion of inserted wax. Again, press mechanism 315 may include a base flange 320 operable to interact with a threaded base fastener 325 in a similar manner as described above. Furthermore, as shown in FIG. 3C, cutter cap 345 may include dual inwardly extending connection members 350 configured to be inserted into corresponding receiving portions 355 formed on opposite sides of the top body 310. The receiving portions 355 may be shaped to receive the connection members 350, such that the cutter cap 345 may rotate about its axis to open (shown in FIG. 3B) and close (shown in FIG. 3A).

As an alternative design, yet another design of an example orthodontic wax dispenser 400 is shown in FIGS. 4A-4G, where the overall length of the orthodontic wax dispenser 400 remains the same (as opposed to orthodontic wax dispensers 100-300 above, where the internal threads are exposed when the inner cavity of the top body is full of wax, and where threading the top body into the bottom body decreases the overall size of the orthodontic wax dispenser 100-300 as wax is extruded). That is, in the orthodontic wax dispenser 400, the internal press mechanism 415 (e.g., piston) moves (screws) within the inner cavity 435 of the top body 410 as the top body 410 and bottom body 405 are rotated in relation to each other, and as wax is extruded via the extrusion aperture 440 based on compression from the linearly moving press mechanism 415 within the orthodontic wax dispenser 400.

Figure 4A:
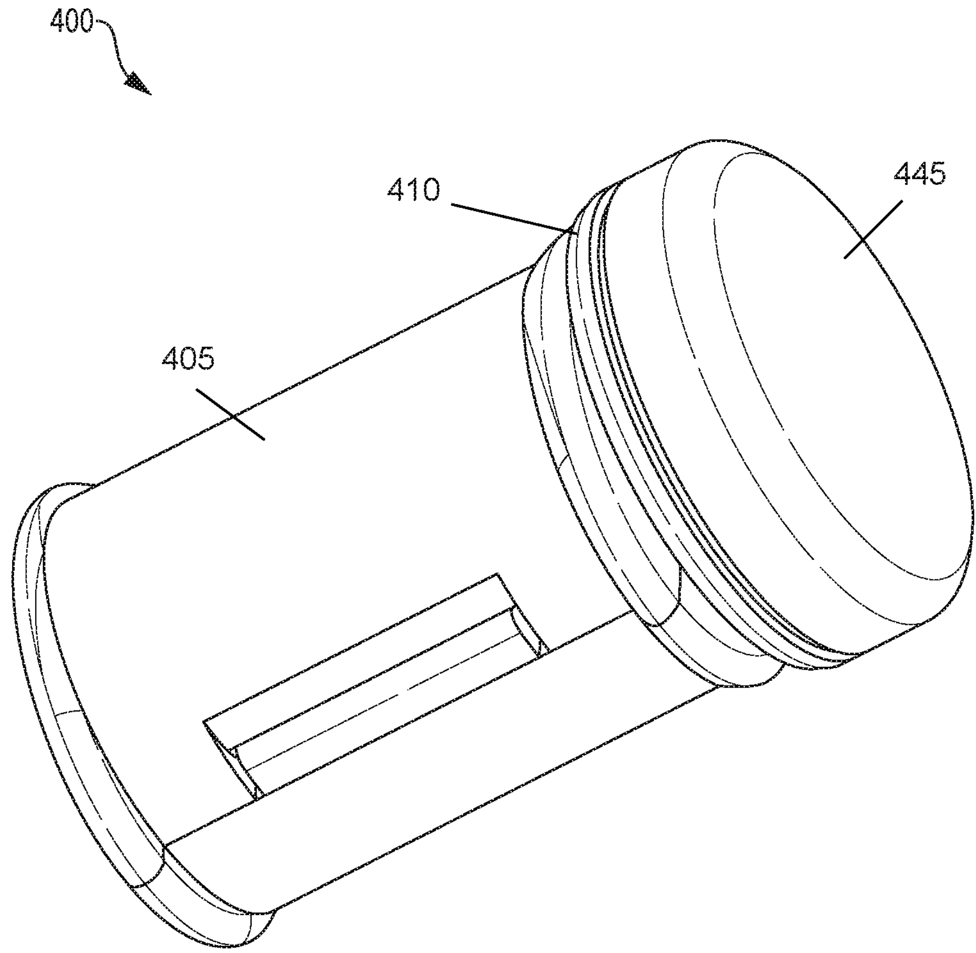
FIGS. 4A-4G illustrate yet another example design of an orthodontic wax dispenser in accordance with one or more embodiments of the present disclosure.
Figure 4B:
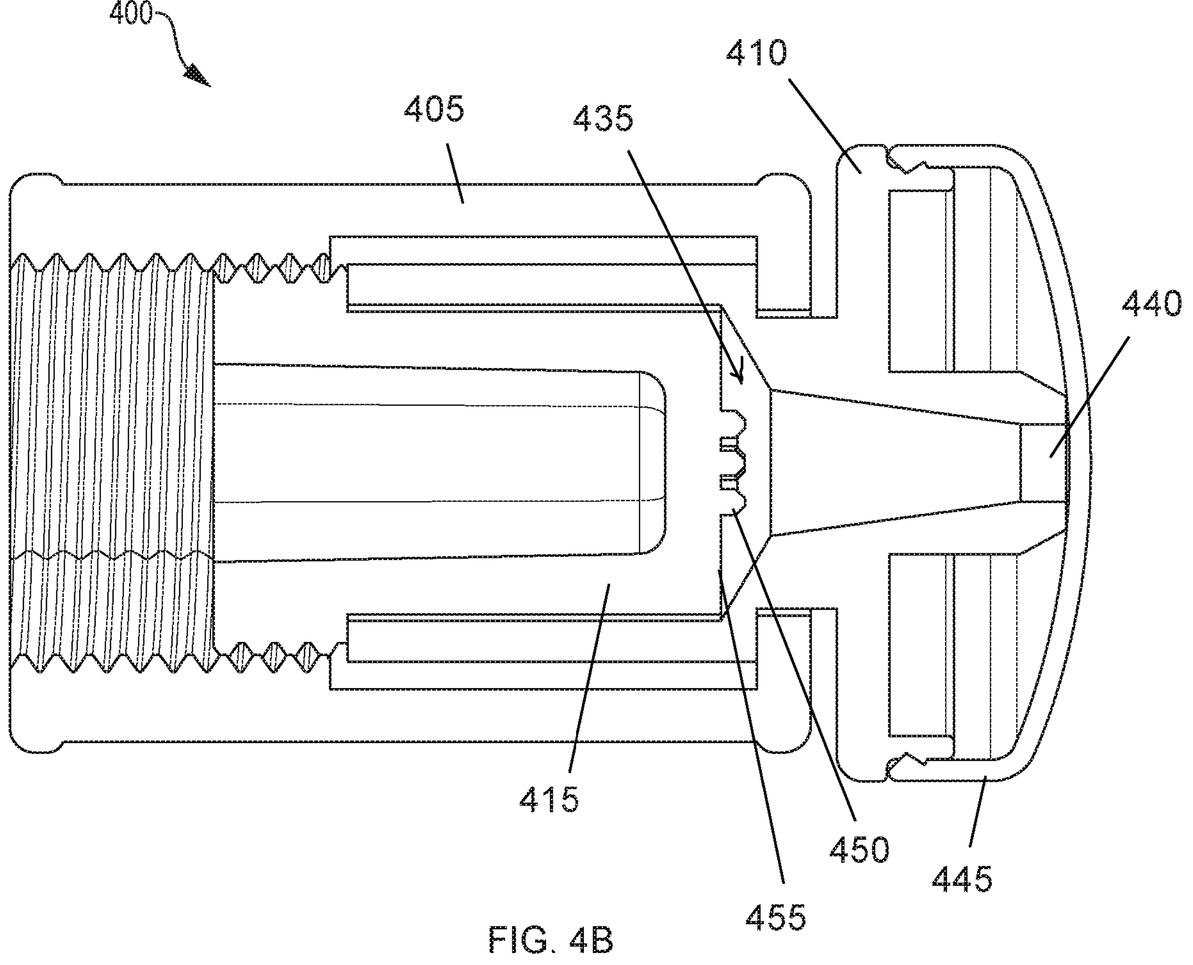

FIG. 4A illustrates the example orthodontic wax dispenser 400 in a closed position, with a closed cap 445. FIG. 4B is a cutaway view of the orthodontic wax dispenser 400 in the closed position showing the press mechanism 415 fully compressed within the inner cavity 435 created by the top body 410.

Figure 4C:
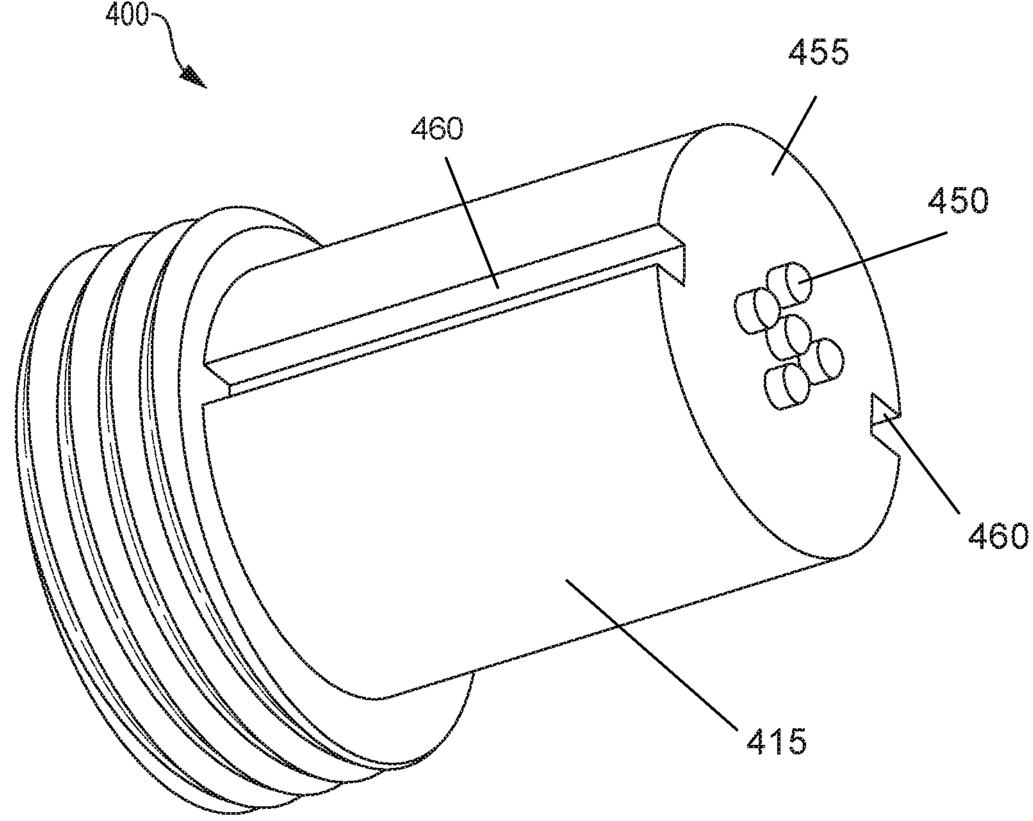

FIG. 4C illustrates an example configuration of the press mechanism 415 of the orthodontic wax dispenser 400. As shown, there are raised posts 450 on the punch surface 455 of the press mechanism 415 to allow sticking the wax to the press mechanism 415 when loading the wax. Also as shown, the outer sides of the press mechanism 415 has a plurality of slides/tracks 460 to engage with mating surfaces 465 of the internal cavity 435 (see FIGS. 4E and 4F) to force threading of the press mechanism 415 as the top body 410 and bottom body 405 of the orthodontic wax dispenser 400 are rotated with respect to each other.

Figure 4D:
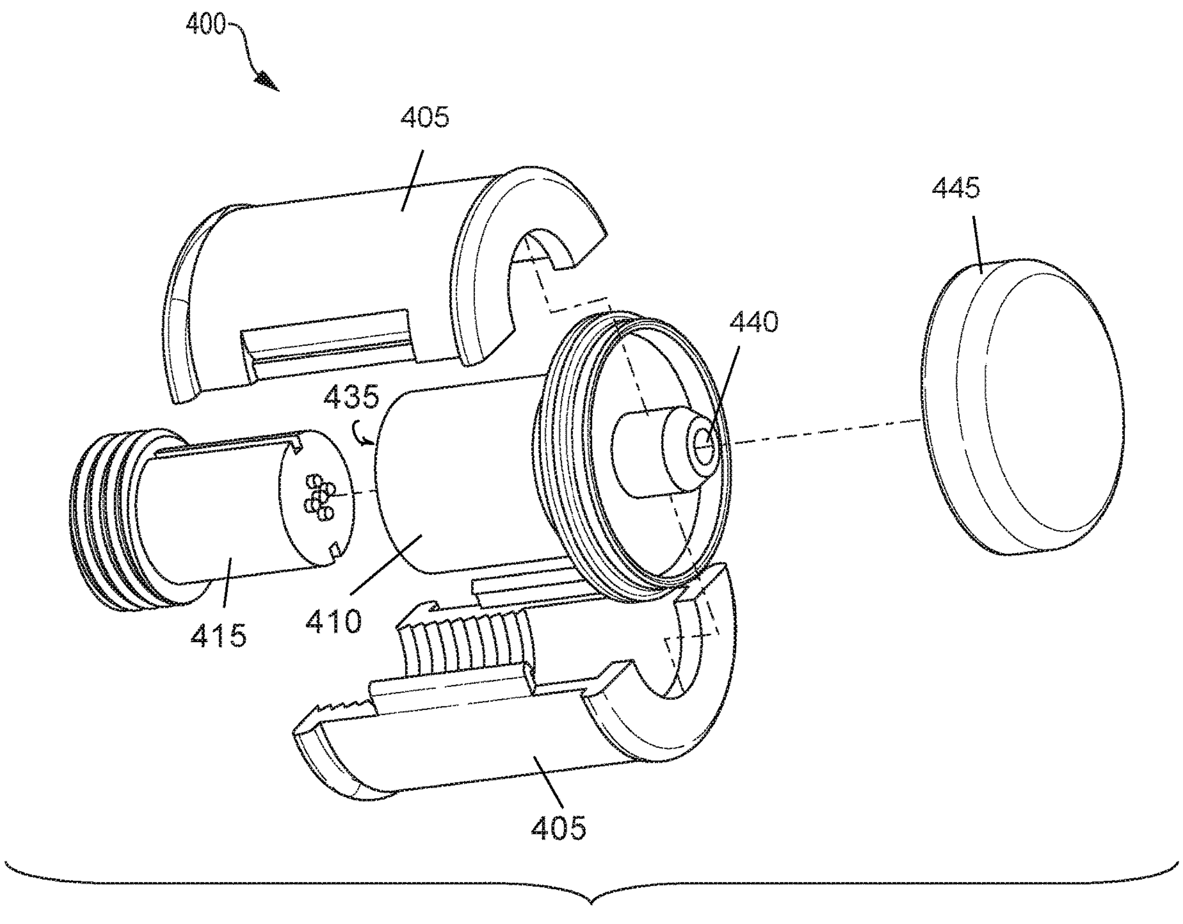

FIG. 4D shows an expanded view of the orthodontic wax dispenser 400, showing the cap 445 removed and an extrusion aperture 440 on the top body 410. Note that by rotating the top body 410, the mating surfaces 465 of top body 410 may engage tracks 460 of the press mechanism 415 to turn the inner press mechanism 415, which then threads within the outer shell (bottom body 405), pushing wax out from the inner cavity 435 through the extrusion aperture 440. As shown, the bottom body 405 is shown as two outer shells (e.g., a split nut) mating together, illustratively the same component in opposing halves that snap together through snap clips to keep it closed, though other clip designs or fastening mechanisms may be used (e.g., glue, welding, screws, etc.).

Figure 4E:
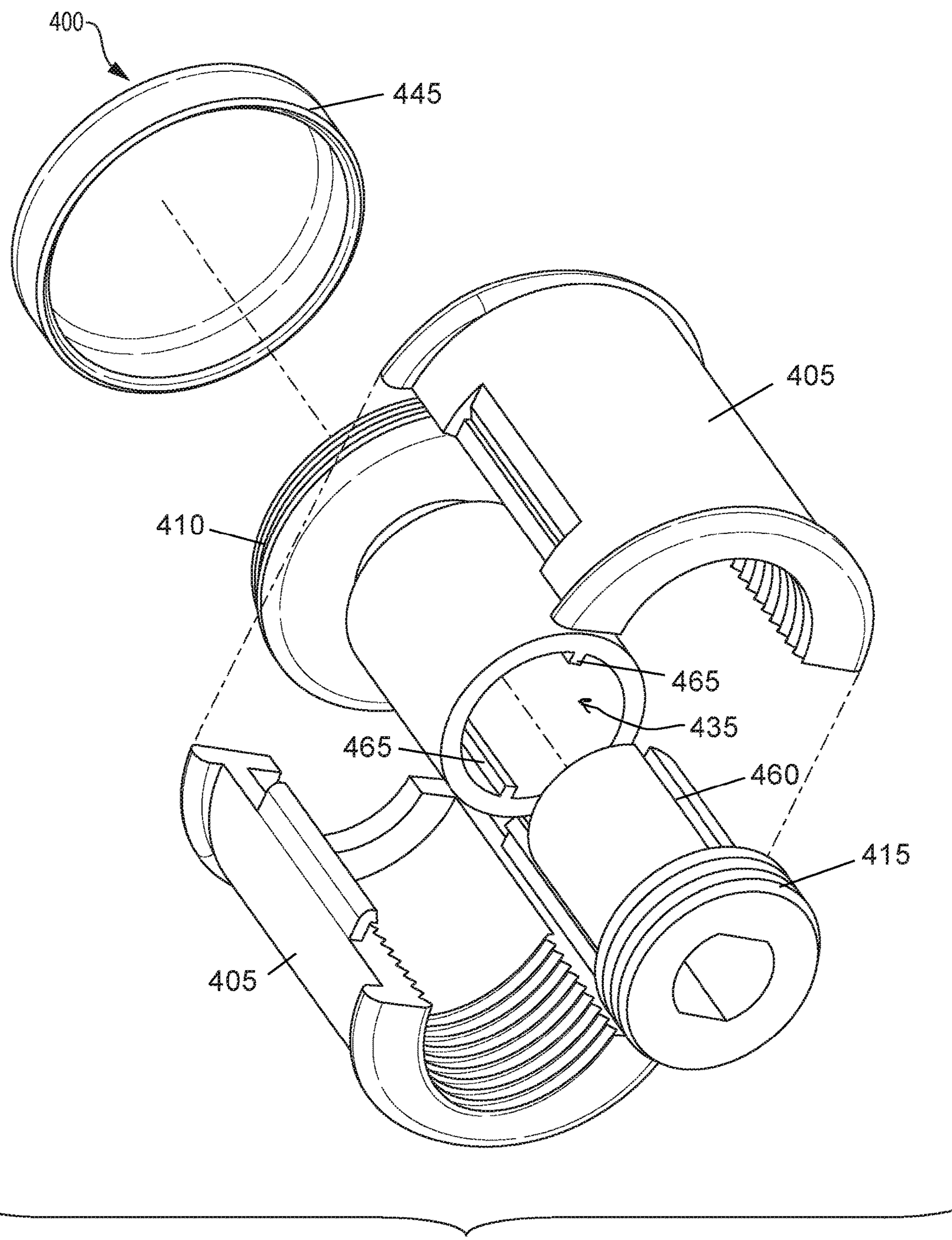
Figure 4F:
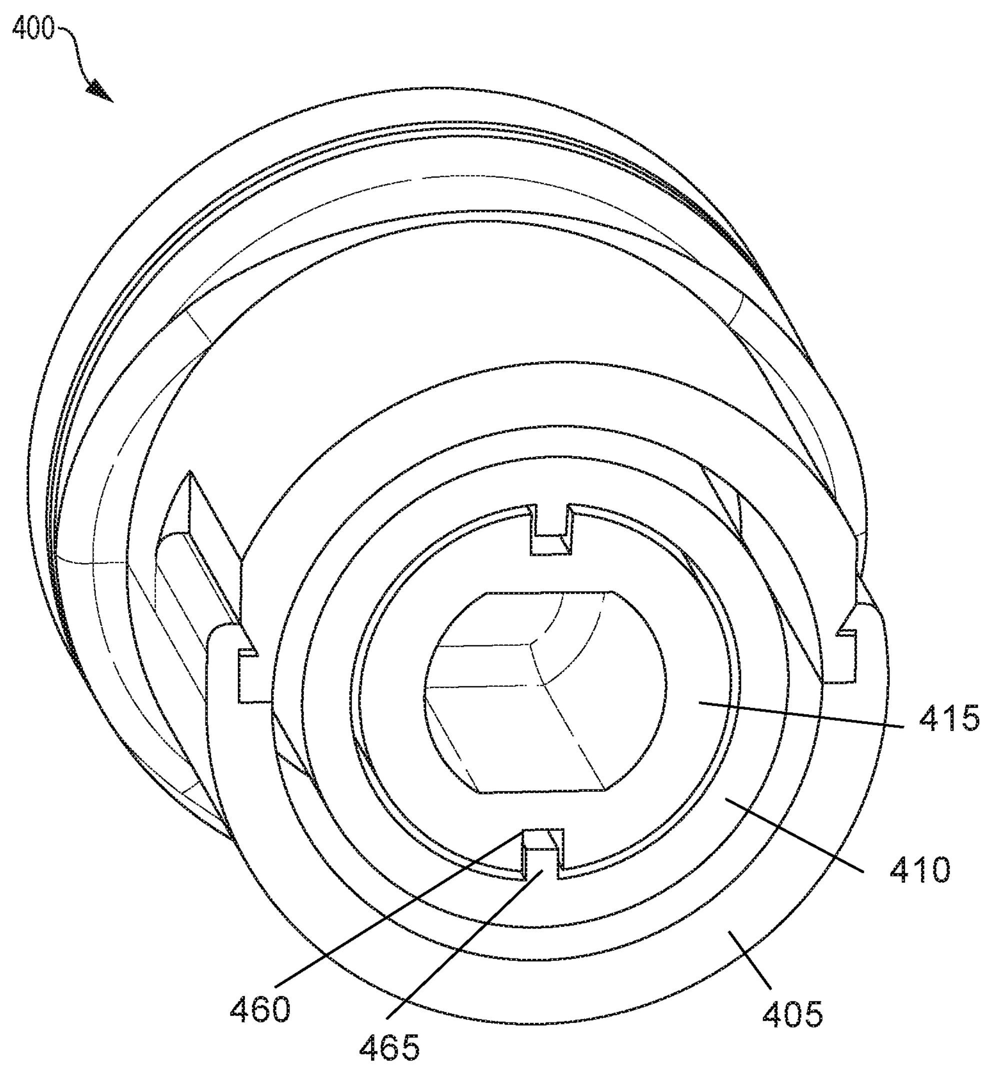
Figure 4G:
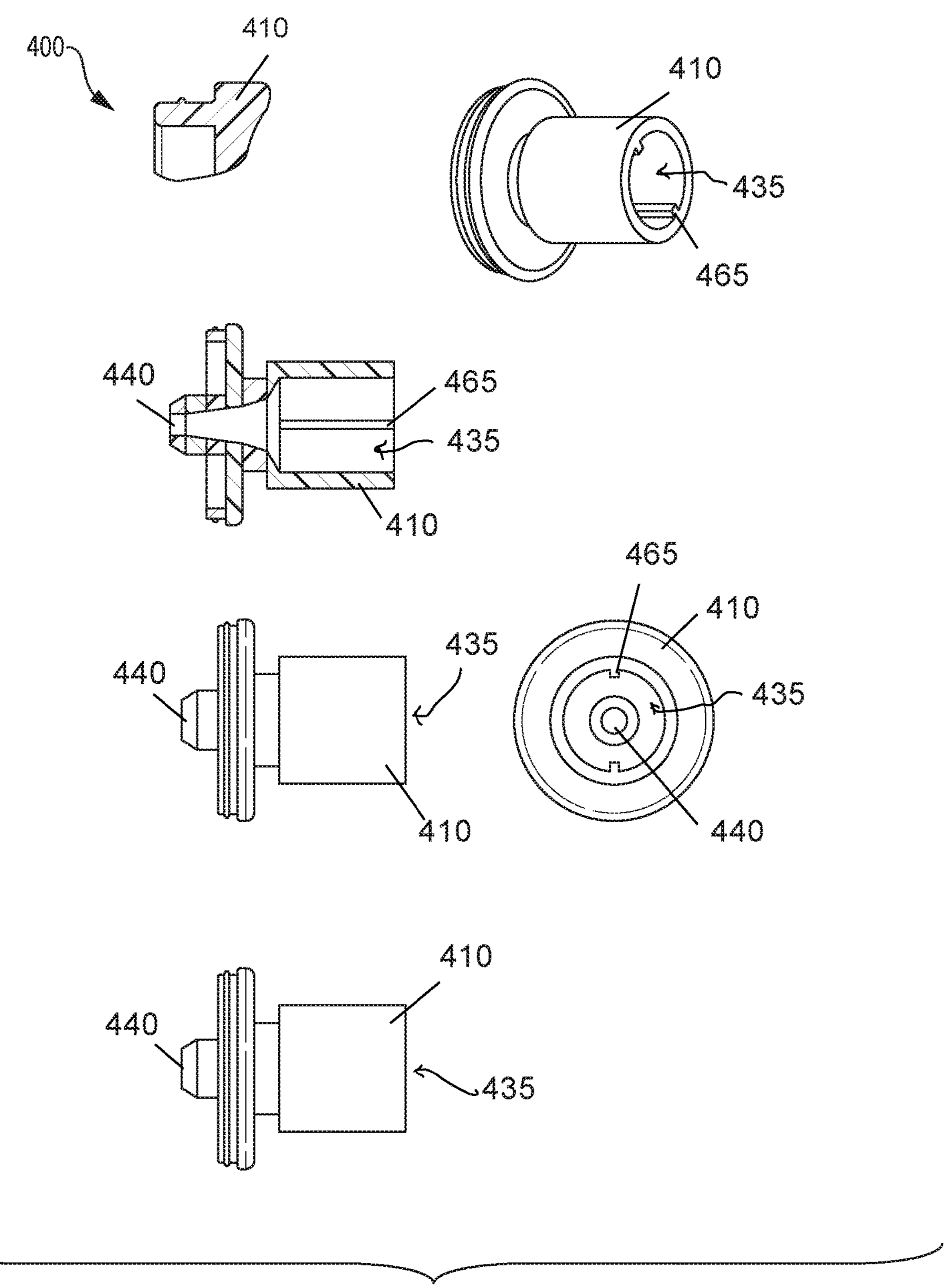

FIG. 4E shows the orthodontic wax dispenser 400 in expanded view from the bottom, showing more clearly the inner cavity 435 of the top body 410, as well as the associated mating surfaces 465 formed within inner cavity 435 of top body 410 operable to engage with tracks 460 of the press mechanism 415. FIG. 4F shows a view of the bottom of the orthodontic wax dispenser 400 when assembled. Lastly, FIG. 4G shows an example computer aided design (CAD) drawing of the components of the example orthodontic wax dispenser 400.

Still another design of an example orthodontic wax dispenser 500 is shown in FIGS. 5A-5D. According to some embodiments of the present disclosure, orthodontic wax dispenser 500 may comprise a press mechanism 515 that is integrated into the bottom body 505. This configuration allows for the press mechanism 515 to be pulled out of the internal cavity 535 of the top body 510 when the dispenser 500 is opened up (e.g., to insert more wax).

Figure 5A:
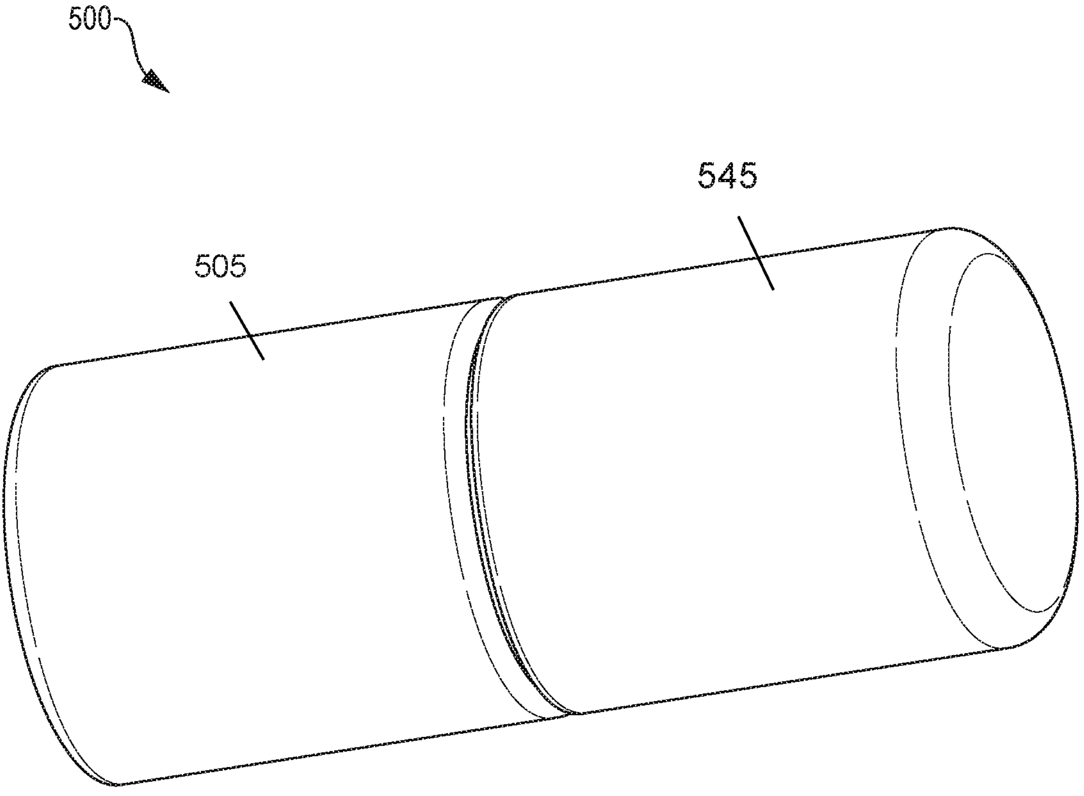
FIGS. 5A-5D illustrate still another example design of an orthodontic wax dispenser in accordance with one or more embodiments of the present disclosure.

FIG. 5A shows the bottom body 505 reversibly fastened to a cover 545. In some embodiments, the cover 545 may be formed so as to fully envelop the top body 510. In some embodiments, the cover 545 may reversibly clip onto the bottom body 505 by virtue of engaging features 560*a* and 560*b* formed on corresponding surfaces of the bottom body 505 and cover 545. Engaging features 560*a* and 560*b* are more clearly shown in FIGS. 5B and 5C. Engaging feature 560*a* may be formed on a proximal external surface of bottom body 505, while engaging feature 560*b* may be formed on a distal internal surface of cover 545. When the bottom body 505 and cover 545 are pressed together, engaging features 560*a* and 560*b* may abut each other and initially provide a degree of resistance, and upon overcoming said resistance, engaging features 560*a* and 560*b* slide past each other such that cover 545 reversibly fastens to the bottom body 505. In the closed position (e.g., see FIGS. 5A-5C), engaging features 560*a* and 560*b* may provide an opposite degree of resistance to an effort to separate the cover 545 from the bottom body 505.

Figure 5B:
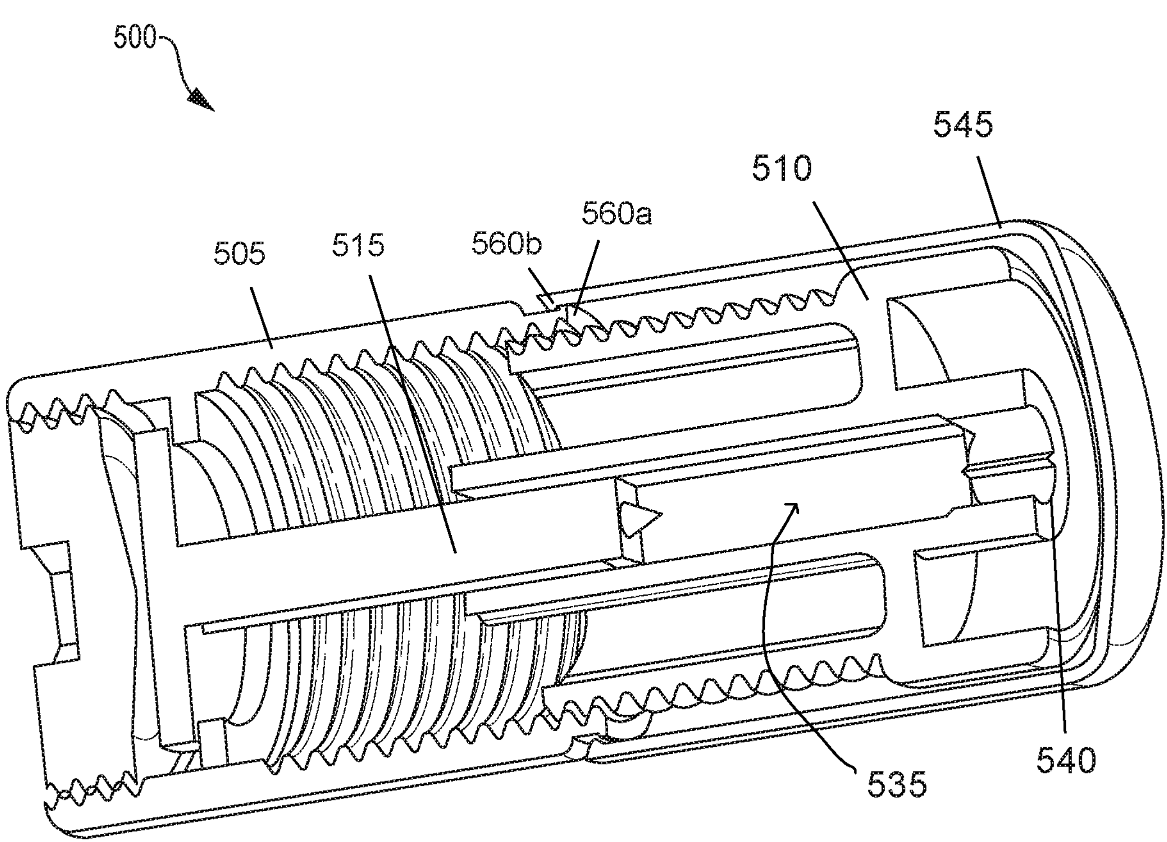
Figure 5C:
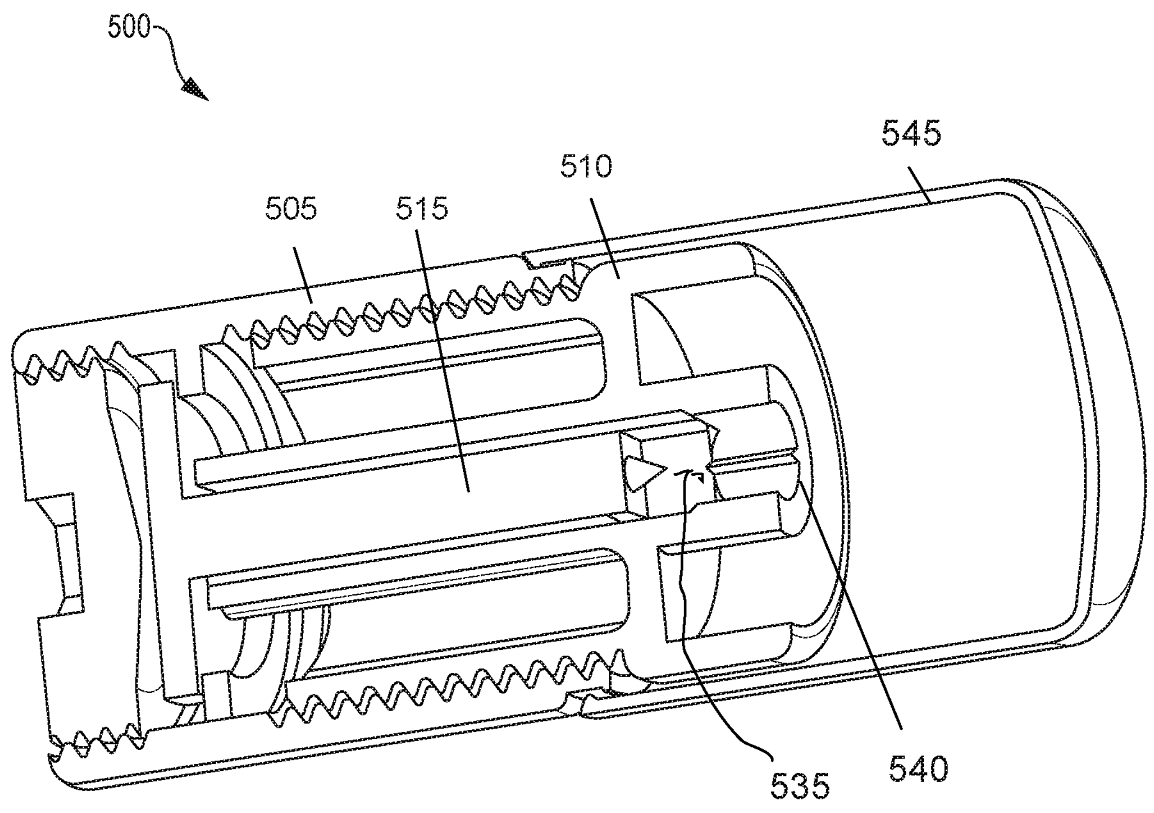

FIGS. 5B and 5C show the linear translation of the top body 510 in relation to the bottom body 505 according to embodiments of the present disclosure. First, in FIG. 5B, top body 510 is extending away from bottom body 505 in a proximal direction, although a distal portion of top body 510 is held by a proximal portion of bottom body 505, by virtue of the respective threads of the top and bottom body 510 and 505. In this position, the internal cavity 535 of the top body 510 is mostly unoccupied by the press mechanism 515, allowing for wax to be held within the cavity 535.

Second, in FIG. 5C, top body 510 is retracted into the interior of bottom body 505, whereby said retraction is caused by rotating the top body 510 in a direction (e.g., clockwise or counterclockwise) causing top body 510 to translate in a distal direction into the bottom body 505. Simultaneously, the press mechanism 515 which is integrated into the bottom body 505 moves further into the internal cavity 535 of the top body 510, causing compression of the wax stored in the cavity 535, and resulting in a portion of the compressed wax being forced through the extrusion aperture 540, as shown in closer detail in FIG. 5D.

Figure 5D:
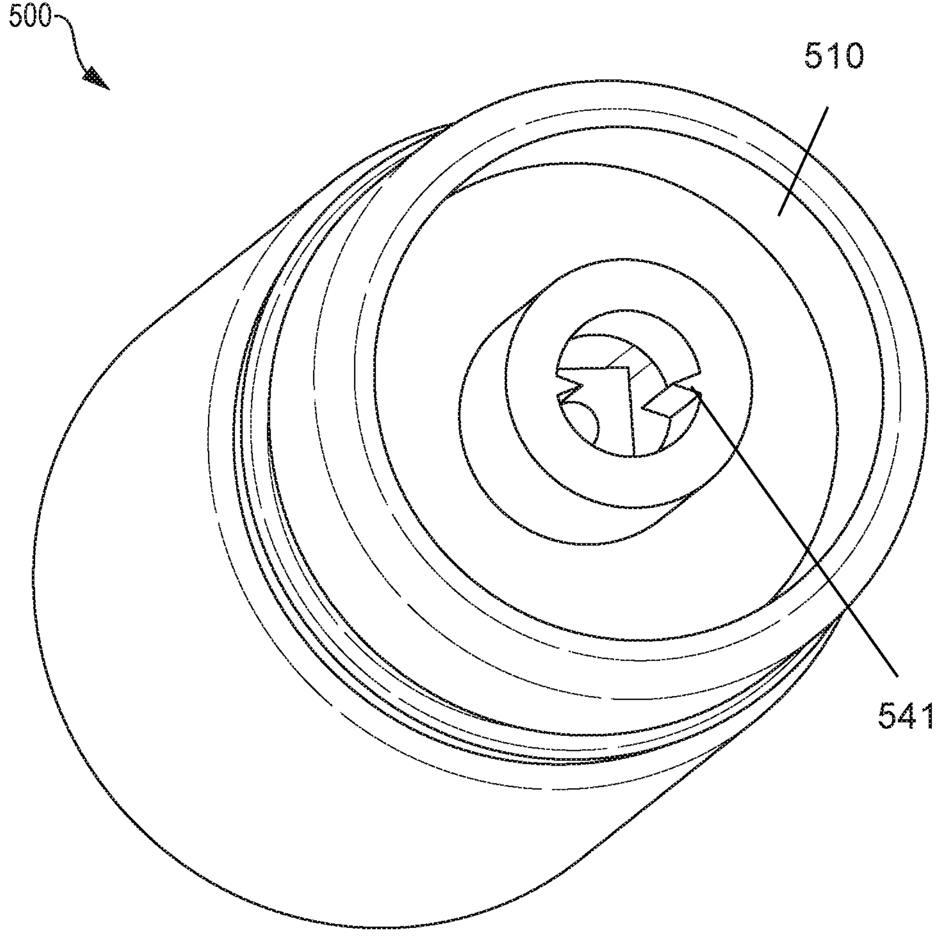

In some embodiments, small teeth 541 may be formed on an internal surface of the extrusion aperture 540, as shown in FIG. 5D, to provide additional resistance as the user dispenses wax from the internal cavity 535 of the top body 510. This may allow for greater control over the amount of wax being extruded from the dispenser 500. Additional structures may also be added to the threads of the bottom body 505 and/or top body 510 to create a "snap"-like feel for the user as the top body 510 is rotated in relation to the bottom body 505.

Figure 6A:
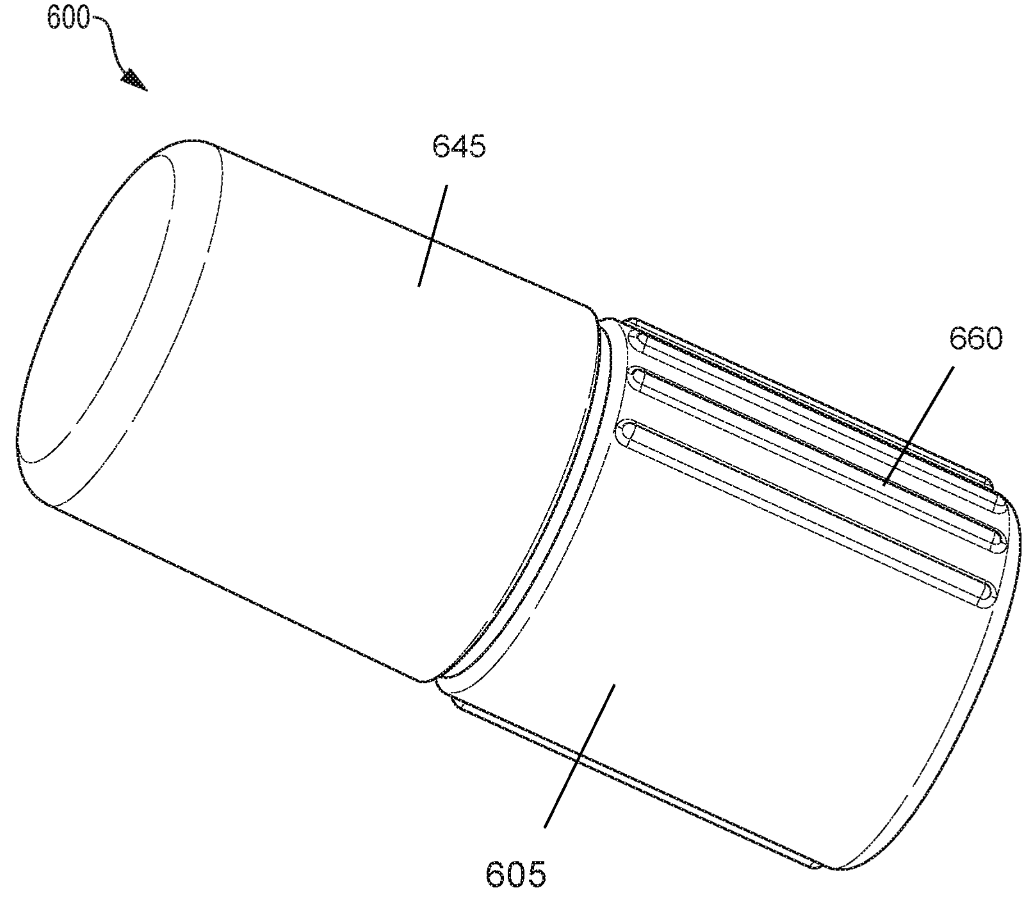
FIGS. 6A-6D illustrate still another example design of an orthodontic wax dispenser in accordance with one or more embodiments of the present disclosure.

Still another design of an example orthodontic wax dispenser 600 is shown in FIGS. 6A-6D. According to some embodiments of the present disclosure, the cover 645 may "snap" onto the bottom body 605, as shown in FIG. 6A, so as to hold the press mechanism 615 in the bottom body 605. Cover 645 and bottom body 605 may be formed with corresponding engaging features akin to engaging features 560*a* and 560*b* that allow for the cover 645 to reversibly snap (e.g., fasten) onto bottom body 605.

Figure 6B:
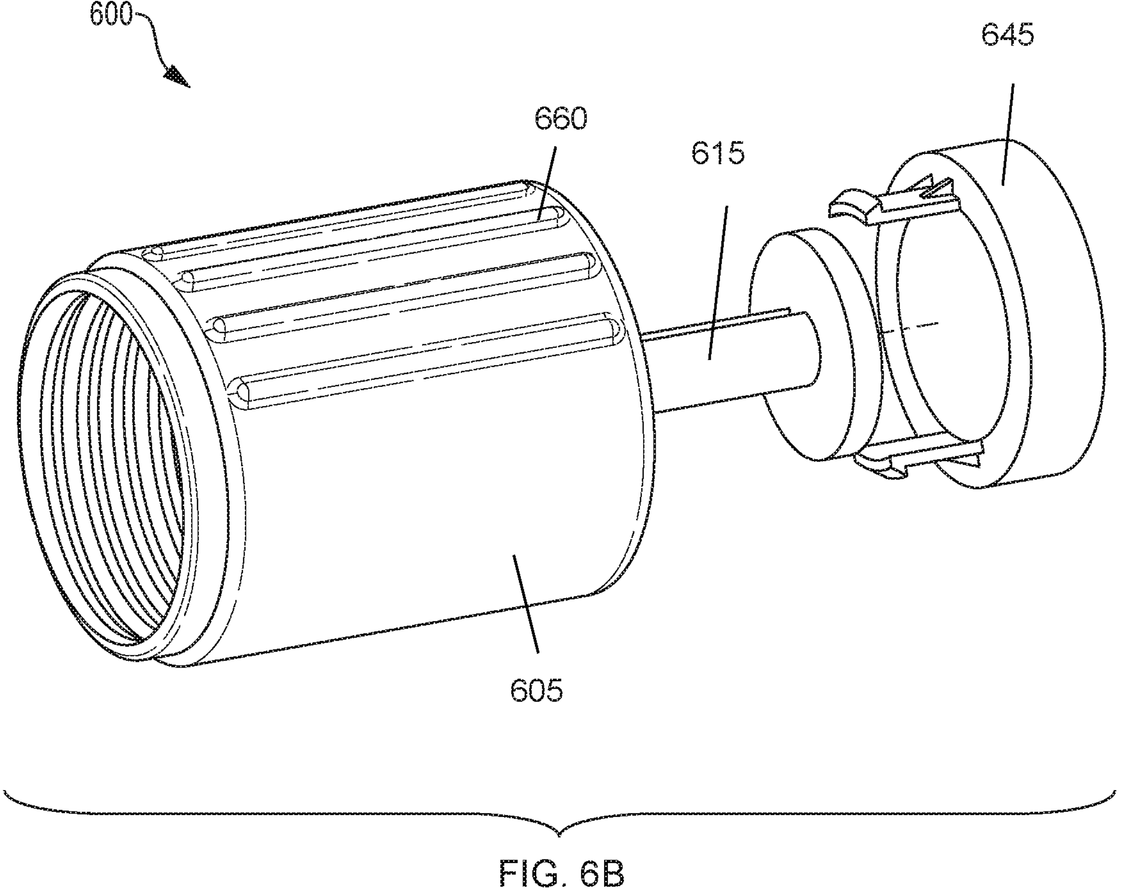
Figure 6C:
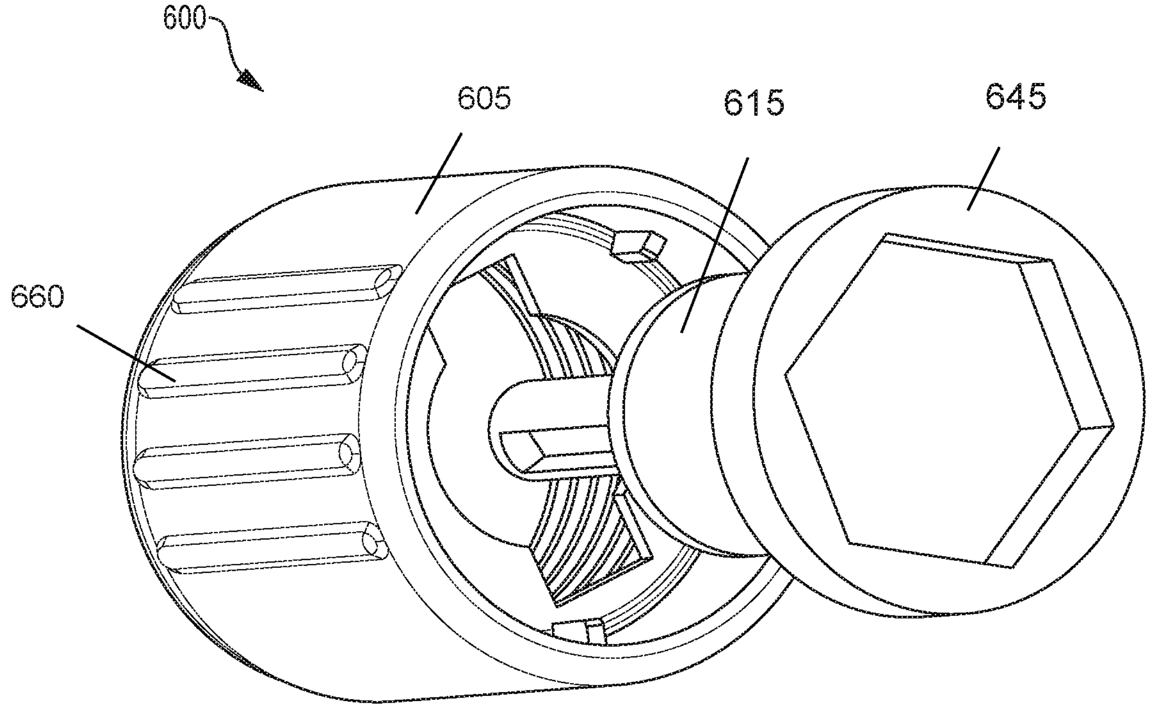

Additionally, ridges 660 may be formed on an outer surface of bottom body 605, as shown in FIGS. 6A-6C, for greater grip when rotating the top body 610 in relation to the bottom body 605. More specifically, outer ridges 660 may be used to provide anti-rotation of the bottom body 605 (i.e., holding the bottom body 605 in a stationary position) during rotation of the top body 610, to more easily allow for linear translation of the top body 610. It should be appreciated that the ridges 660 may be formed on the outer surface of bottom body 605 in any suitable configuration (e.g., number of ridges, location of ridges, orientation of ridges, etc.).

Figure 6D:
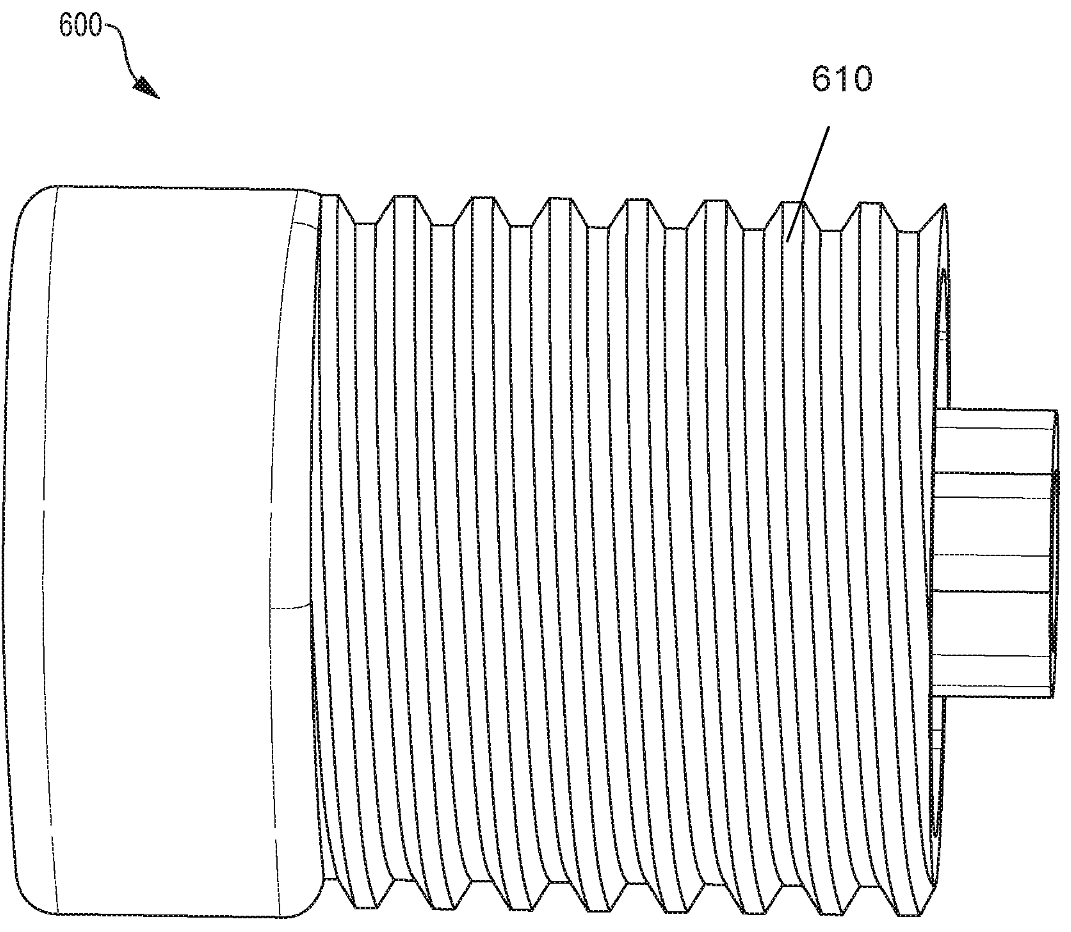

FIG. 6D shows the top body 610 including external threads disposed along an outer surface thereof. In some embodiments, the outer end of the threads of top body 610 may be formed so as to be flat (rather than a point), as shown in the figure. Advantageously, forming the threads in this manner may generate greater clamping force.

Other embodiments, including various designs, shapes, and accessories, may also be used in accordance with the embodiments described herein. For instance, various hooks, clips, clasps, etc., may be placed on the orthodontic wax dispensers above to allow attaching to a belt loop, backpack, purse, jacket, luggage, and so on. Additionally, various holders may be designed to encompass the orthodontic wax dispensers, such as silicon sleeves, wraps, pockets, etc., sized and shaped to carry the orthodontic wax dispensers, and to then provide not only an aesthetic design, but also a softer outer surface and one or more mechanisms for attachment to allow the orthodontic wax dispensers to be carried on various personal articles, as mentioned above. Furthermore, while the outside of the orthodontic wax dispensers are shown as generally rounded (e.g., circular, oval, etc.), other shapes may also be used, including, but not limited to, other polygons (e.g., squares, rectangles, triangles, etc.) or other shapes entirely (e.g., characters, figurines, sports paraphernalia, and so forth). The same is also true of any caps and/or covers of the orthodontic wax dispensers above, allowing for various customizations, inserts, shape changes, grips (e.g., for adaptive markets), and so on.

Figure 7:
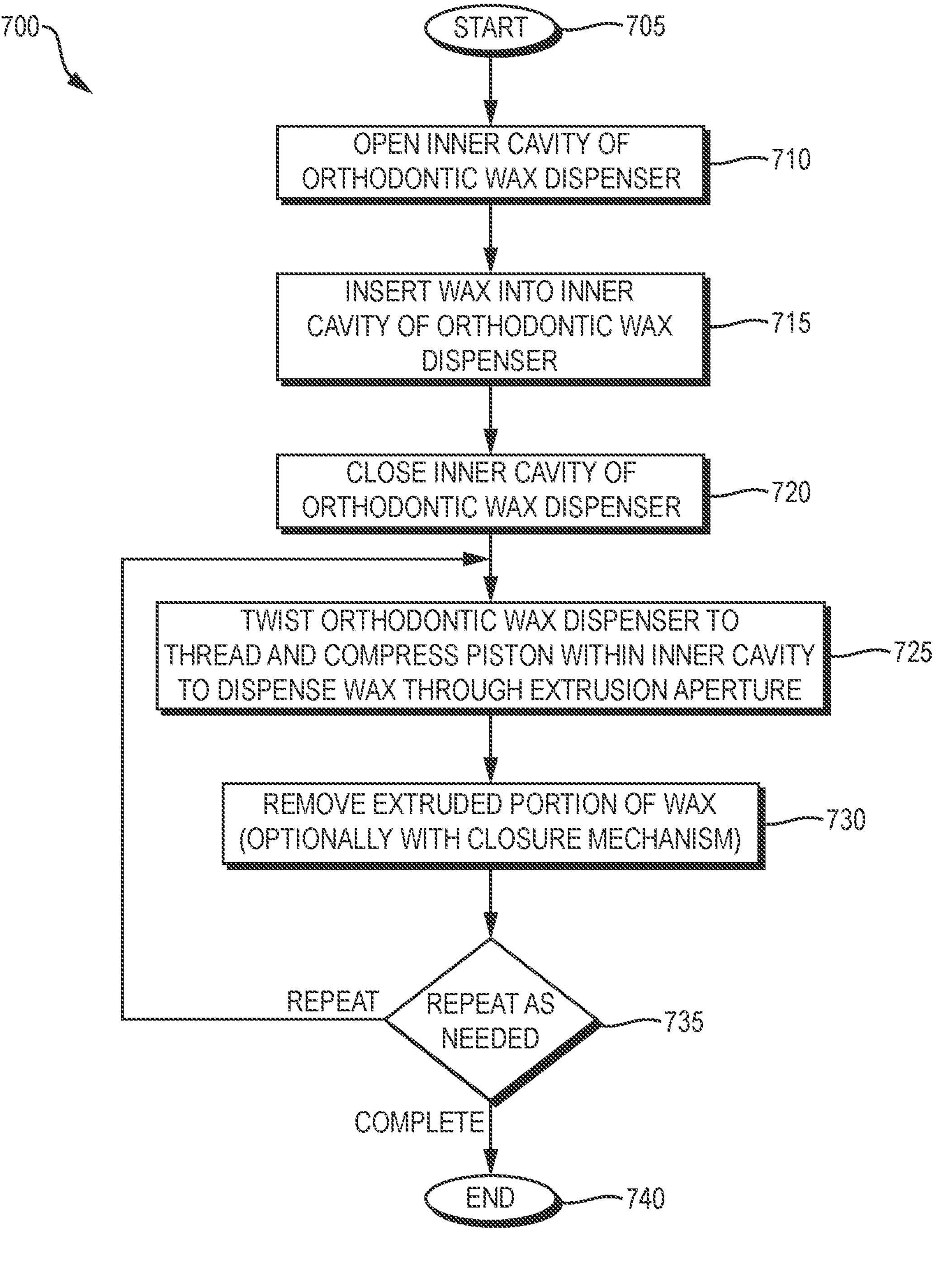
FIG. 7 illustrates an example simplified procedure for operating an orthodontic wax dispenser in accordance with one or more embodiments of the present disclosure.

FIG. 7 illustrates an example simplified procedure for operating an orthodontic wax dispenser in accordance with one or more embodiments described herein, such as for any of orthodontic wax dispensers 100, 200, 300, 400, 500, or 600 described above. Procedure 700 may start at step 705 and continue to step 710, where, generally, a user opens the inner cavity of the orthodontic wax dispenser, and then inserts wax into the inner cavity of the orthodontic wax dispenser in step 715. After closing the inner cavity of the orthodontic wax dispenser in step 720, the user may then begin to twist the orthodontic wax dispenser (the top in relation to the bottom, or alternatively, the inside in relation to the outside) to thread and compress the piston within inner cavity to dispense wax through the extrusion aperture in step 725. Once a desired amount of wax has been extruded, in step 730 the user may remove the extruded portion of wax in step 730, either with their fingers or optionally with a closure mechanism as described above. The process of twisting (threading) to extrude more wax in step 725, and removing the extruded wax in step 730, may repeat as needed until complete in step 735. The simplified procedure 700 then ends in step 740 once complete, and may return later to step 725 to begin extruding more wax, or to step 705 to reload more wax into the orthodontic wax dispenser, if needed, accordingly.

It should be noted that the steps shown and described in the procedure(s) above are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide an orthodontic wax dispenser. In particular, the apparatus described herein is easy to use, lightweight, and fits in a pocket, and is able to use current waxes found in orthodontist offices and generally available in stores.

According to one or more embodiments herein, an illustrative orthodontic wax dispenser comprises: a bottom body, wherein the bottom body is hollow and comprises internal threads; a top body, wherein the top body is hollow and comprises an inner cavity configured to store wax, wherein the bottom body is configured to receive the top body, and wherein the top body comprises external threads configured to engage with the internal threads of the bottom body, to enable the top body to be fastened and rotated in relation to the bottom body; a press mechanism disposed inside of the bottom body and at least partially disposed inside of the inner cavity of the top body, wherein the press mechanism comprises a flange at a distal end thereof, and wherein the flange is in rotatable engagement with a distal lip of the bottom body; a base fastener disposed inside of the bottom body at a distal end of the bottom body, wherein the base fastener is configured to hold the flange of the press mechanism within the bottom body; and an extrusion aperture disposed at a proximal end of the top body, wherein, upon rotation of the top body, the top body is translated along a longitudinal axis of the bottom body, and wherein translation of the top body toward the distal end of the bottom body causes compression of the wax stored in the inner cavity of the top body by the press mechanism, such that a portion of the wax under compression is forced through the extrusion aperture.

In one embodiment, the top body further comprises a sliding cutter integrated into the top body configured to cut extruded wax that slides across the extrusion aperture when slid across the extrusion aperture from an open position to a closed position.

In one embodiment, the top body further comprises a rotating cap configured to cut extruded wax that slides across aperture when rotated about the top body from an open position to a closed position.

In one embodiment, the top body further comprises a pivoting cutter cap that is connected to a top of the bottom body at two points, and wherein the pivoting cutter cap is configured to rotate on its axis to open to allow extrusion of the wax, and further configured to cut the wax when returning to its closed position.

In one embodiment, the press mechanism further comprises one or more vertical tracks configured to be engaged with the top body, wherein the top body further comprises one or more vertical grooves configured to receive the one or more vertical tracks of the press mechanism, and wherein the press mechanism engages the one or more vertical grooves of the top body as it is rotated to extrude the wax from the inner cavity.

In one embodiment, the press mechanism further comprises a punch surface wherein the punch surface includes raised posts to enable sticking the wax to the press mechanism when loading the wax.

In one embodiment, the bottom body is further comprised of two outer shells mated together, wherein the two outer shells snap together via a fastening mechanism, configured to enable disassembly.

In one embodiment, the orthodontic wax dispenser further comprises: one or more additional inner cavities in the top body for storage of extra wax that is not compressed when twisting.

In one embodiment, the wax is orthodontic wax. In one embodiment, the orthodontic wax is provided as an elongated stick for insertion into the inner cavity.

In one embodiment, the orthodontic wax dispenser further comprises: a cap to cover the top body.

In one embodiment, the bottom body includes an exterior further comprising a plurality of ridges.

In one embodiment, the base fastener further comprises external threads configured to engage with a second set of internal threads at the distal end of the bottom body.

In one embodiment, the base fastener comprises a snapping mechanism configured to engage with the distal end of the bottom body.

In one embodiment, the wax is loaded into the inner cavity by removing the top body.

In one embodiment, the wax is loaded into the inner cavity by removing the press mechanism.

In one embodiment, the inner cavity is between ⅛" to ½" in diameter.

In one embodiment, the inner cavity is between ½" to 4" long, and wherein a length of the orthodontic wax dispenser is at least double a length of the inner cavity.

In one embodiment, the inner cavity has a square cross section, and the press mechanism has a square cross section.

According to one or more additional embodiments herein, an illustrative method of using an orthodontic wax dispenser may comprise: opening an inner cavity of a top body of the orthodontic wax dispenser; inserting wax into the inner cavity of the orthodontic wax dispenser; closing the inner cavity of the orthodontic wax dispenser; rotating the top body of the orthodontic wax dispenser to thread the top body in relation to a bottom body of the orthodontic wax dispenser and compress a press mechanism within the inner cavity to dispense the wax through an extrusion aperture formed in the top body; and removing the wax dispensed through the extrusion aperture.

While the present disclosure has illustrated various embodiments of the orthodontic wax dispenser, other configurations may be made within the scope of the invention. For instance, while certain materials have been shown for each component, other suitable materials may be used. Furthermore, while certain shapes or designs of the components have been shown and described, functionally similar designs may also be utilized herein. Moreover, while components of the present disclosure may be described separately and in separate figures, certain components from each embodiment may be incorporated into each other embodiment, and the components shown in each of the illustrations are not meant to be mutually exclusive. That is, various combinations of components may be made with the scope of the present disclosure by combining the described components in useful manners.

Additionally, while orthodontic wax (or dental wax, braces wax, etc.) is the primary material intended to be dispensed, the embodiments herein may also be directed toward pocket-sized dispensers for other hand-extrudable materials, such as various putties, pastes, candies, food products, and so on. Moreover, while the components of the orthodontic wax dispensers have been generally described in terms of plastic pieces, any suitable material (e.g., metals, polymers, etc.) may be used herein.

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. An orthodontic wax dispenser, comprising:

a bottom body, wherein the bottom body is hollow and comprises internal threads;

a top body, wherein the top body is hollow and comprises an inner cavity configured to store orthodontic wax, wherein the bottom body is configured to receive the top body, and wherein the top body comprises external threads configured to engage with the internal threads of the bottom body, to enable the top body to be fastened and rotated in relation to the bottom body;

a press mechanism disposed inside of the bottom body and at least partially disposed inside of the inner cavity of the top body, wherein the press mechanism comprises a flange at an end of the press mechanism;

a base fastener disposed inside of the bottom body at an end of the bottom body, wherein the base fastener is configured to hold the flange of the press mechanism within the bottom body; and an extrusion aperture disposed at a proximal end of the top body, wherein rotation of the top body relative to the bottom body causes axial translation of the top body relative to the press mechanism along a longitudinal axis of the bottom body, wherein translation of the top body toward the end of the bottom body causes compression of orthodontic wax stored in the inner cavity against the press mechanism such that a portion of the orthodontic wax is forced through the extrusion aperture, and wherein the base fastener is threaded and configured to engage with internal threads at the end of the bottom body.

2. The orthodontic wax dispenser of claim 1, wherein the press mechanism further comprises a punch surface wherein the punch surface includes raised posts to enable sticking the orthodontic wax to the press mechanism when loading the orthodontic wax.

3. The orthodontic wax dispenser of claim 1, further comprising:

one or more additional inner cavities in the top body for storage of extra wax that is not compressed when twisting.

4. The orthodontic wax dispenser of claim 1, wherein the orthodontic wax is provided as an elongated stick for insertion into the inner cavity.

5. The orthodontic wax dispenser of claim 1, further comprising:

a cap to cover the top body.

6. The orthodontic wax dispenser of claim 1, wherein the orthodontic wax is loaded into the inner cavity by removing the top body.

7. The orthodontic wax dispenser of claim 1, wherein the orthodontic wax is loaded into the inner cavity by removing the press mechanism.

8. The orthodontic wax dispenser of claim 1, wherein the inner cavity is between ⅛" to ½" in diameter.

9. The orthodontic wax dispenser of claim 1, wherein the inner cavity is between ½" to 4" long, and wherein a length of the orthodontic wax dispenser is at least double a length of the inner cavity.

10. The orthodontic wax dispenser of claim 1, wherein the inner cavity has a square cross section, and the press mechanism has a square cross section.

11. The orthodontic wax dispenser of claim 1, wherein the press mechanism is held within the bottom body by the base fastener during rotation of the top body.

12. The orthodontic wax dispenser of claim 1, wherein the inner cavity has a non-circular cross section and the press mechanism has a corresponding non-circular cross section.

13. The orthodontic wax dispenser of claim 1, wherein the press mechanism does not advance into the extrusion aperture during dispensing of the orthodontic wax.

14. The orthodontic wax dispenser of claim 1, wherein the orthodontic wax is provided as an elongated stick loaded into the inner cavity.

* * * * *